United States Patent
Haberkamp et al.

(10) Patent No.: US 10,471,813 B2
(45) Date of Patent: Nov. 12, 2019

(54) SOFT FRONT COCKPIT COVER

(71) Applicant: Bestop, Inc., Louisville, CO (US)

(72) Inventors: William H. Haberkamp, Rochester Hills, MI (US); George C. Stickles, Thornton, CO (US); Duane C. Junkin, Madison Heights, MI (US)

(73) Assignee: Bestop, Inc., Louisville, CO (US)

( * ) Notice: Subject to any disclaimer, the term of this patent is extended or adjusted under 35 U.S.C. 154(b) by 0 days.

(21) Appl. No.: 15/901,561

(22) Filed: Feb. 21, 2018

(65) Prior Publication Data

US 2018/0178639 A1  Jun. 28, 2018

Related U.S. Application Data

(63) Continuation of application No. 15/276,386, filed on Sep. 26, 2016, now Pat. No. 9,931,921, which is a
(Continued)

(51) Int. Cl.
  *B60J 7/12*  (2006.01)
  *B60J 10/90*  (2016.01)
  *B60J 7/10*  (2006.01)

(52) U.S. Cl.
  CPC .............. *B60J 7/1291* (2013.01); *B60J 7/10* (2013.01); *B60J 7/12* (2013.01); *B60J 10/90* (2016.02)

(58) Field of Classification Search
  CPC ..... B60J 7/10; B60J 7/12; B60J 7/1291; B60J 10/90; B60J 7/08; B60J 7/11
(Continued)

(56) References Cited

U.S. PATENT DOCUMENTS 5,299,850 A * 4/1994 Kaneko .................. B60J 7/1291
  296/107.13
5,310,241 A * 5/1994 Omoto ..................... B60J 7/061
  296/219
(Continued)

FOREIGN PATENT DOCUMENTS

BE   350 963 A   4/1928
DE   29715809 U1   10/1997
(Continued)

OTHER PUBLICATIONS

International Search Report for International Application No. PCT/US2015/022716, dated Jun. 12, 2015.
(Continued)

Primary Examiner — Dennis H Pedder
(74) Attorney, Agent, or Firm — Warn Partners, P.C.

(57) ABSTRACT

A soft panel top assembly for a vehicle in sealing engagement with a hard top portion of a roof. The soft panel top assembly has a fixed portion attached to the vehicle and a lightweight pivotal portion that folds back to provide a quick and easy open air effect. Two door rails of the soft panel top assembly are connected to the vehicle. Two side rail linkage assemblies are attached to the header, which is secured to a windshield frame when in a closed position, and are connected at pivot points created with a bracket attached to the door rails to allow the pivotal portion to pivot to an open position. The soft panel top assembly includes a rear header that is lightweight and has a sealing arrangement that engages with the hard top roof portion and existing seal of the hard top roof portion to provide a weatherproof seal.

15 Claims, 21 Drawing Sheets

Related U.S. Application Data continuation-in-part of application No. 14/831,414, filed on Aug. 20, 2015, now Pat. No. 9,539,888, which is a continuation-in-part of application No. 14/243,359, filed on Apr. 2, 2014, now Pat. No. 9,139,073, said application No. 15/276,386 is a continuation-in-part of application No. 14/808,011, filed on Jul. 24, 2015, now Pat. No. 9,517,684, which is a continuation of application No. 14/243,359, filed on Apr. 2, 2014, now Pat. No. 9,139,073, said application No. 15/276,386 is a continuation-in-part of application No. 15/128,773, filed as application No. PCT/US2015/022716 on Mar. 26, 2015, now Pat. No. 9,517,684.

(60) Provisional application No. 61/807,506, filed on Apr. 2, 2013, provisional application No. 61/970,463, filed on Mar. 26, 2014.

(58) Field of Classification Search
USPC .................................. 296/218, 219, 216.06
See application file for complete search history.

(56) References Cited

U.S. PATENT DOCUMENTS

| | | | |
|---|---|---|---|
| 6,206,450 B1 | 3/2001 | Ide et al. | |
| 6,409,247 B1 | 6/2002 | Maass | |
| 9,346,342 B1 * | 5/2016 | Bowles | B60J 7/11 |
| 9,776,488 B2 | 10/2017 | Bowles | |
| 9,963,022 B2 * | 5/2018 | Bowles | B60J 7/1291 |
| 2001/0030443 A1 | 10/2001 | Barker | |
| 2003/0155795 A1* | 8/2003 | Dietl | B60J 7/061 296/219 |
| 2004/0108747 A1 | 6/2004 | Obendiek | |
| 2005/0134096 A1 | 6/2005 | Fallis, III et al. | |
| 2012/0098292 A1 | 4/2012 | Huotari et al. | |
| 2012/0286540 A1 | 11/2012 | Moran | |
| 2014/0138983 A1 | 5/2014 | Haberkamp et al. | |
| 2015/0246605 A1 | 9/2015 | Kleinhoffer et al. | |
| 2015/0352937 A1 | 12/2015 | Haberkamp et al. | |
| 2016/0236556 A1 | 8/2016 | Smith et al. | |
| 2016/0263975 A1 | 9/2016 | Bowles | |

FOREIGN PATENT DOCUMENTS

| | | |
|---|---|---|
| DE | 19927234 C1 | 7/2000 |
| DE | 101 02 643 A1 | 7/2002 |
| DE | 202011105496 U1 | 1/2012 |
| FR | 2937591 A1 | 4/2010 |
| GB | 311 081 A | 5/1929 |
| GB | 336 514 A | 10/1930 |
| GB | 919408 * | 2/1963 |
| WO | 0132455 A2 | 5/2001 |
| WO | 2004/056596 A2 | 7/2004 |

OTHER PUBLICATIONS

Extended European Search Report for Application No. EP 17 19 4977 dated Mar. 26, 2018.

* cited by examiner

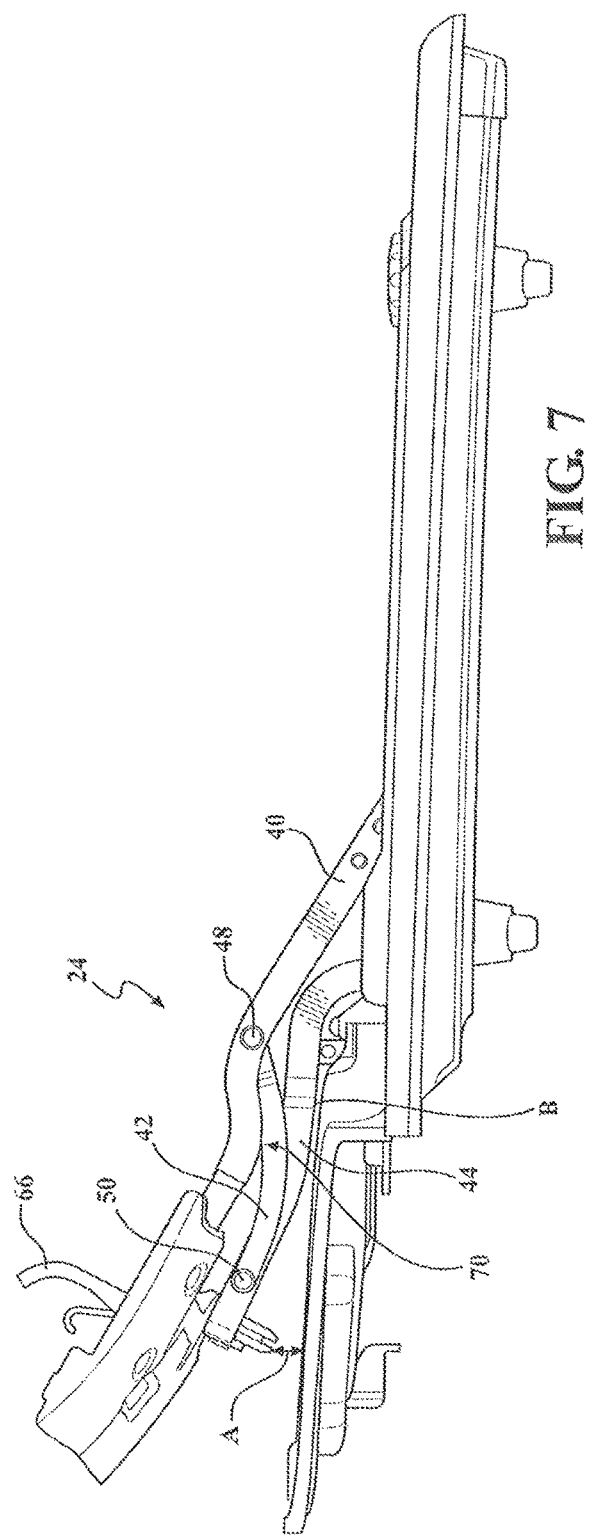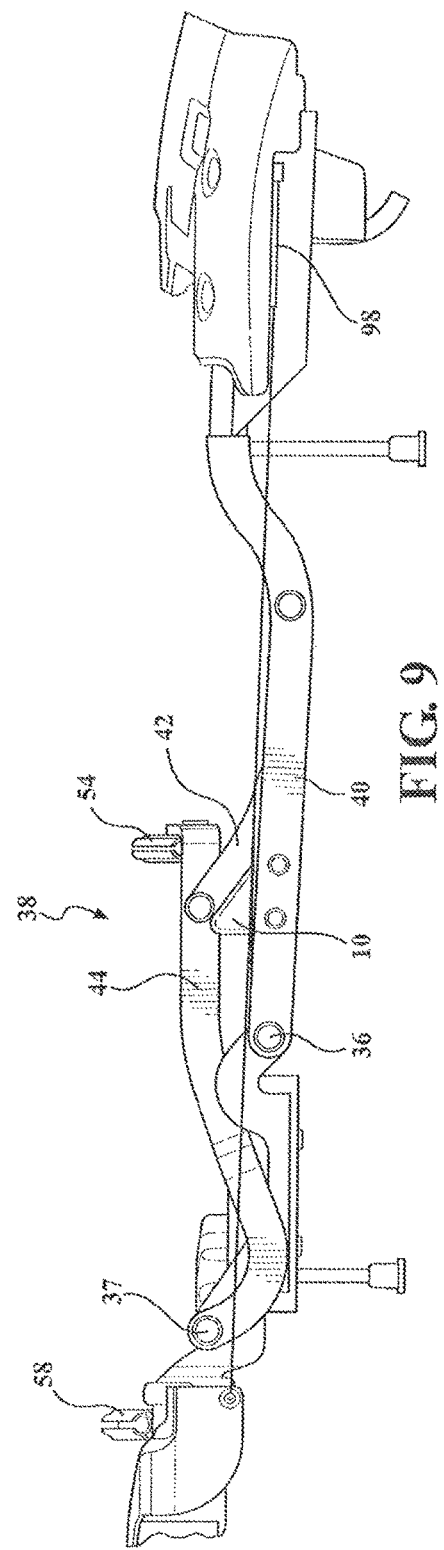

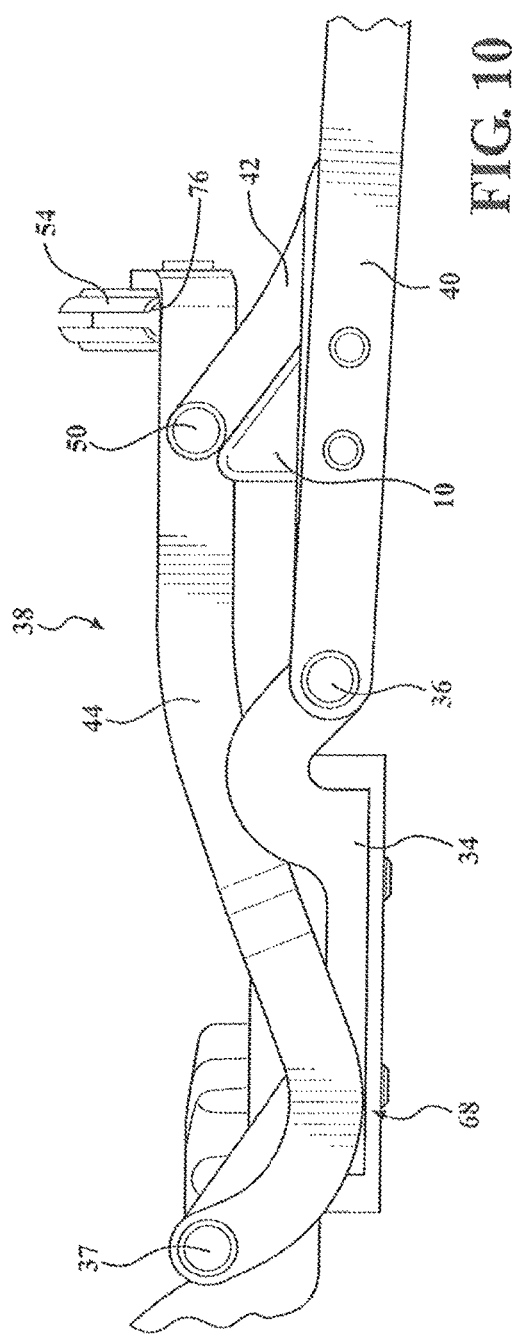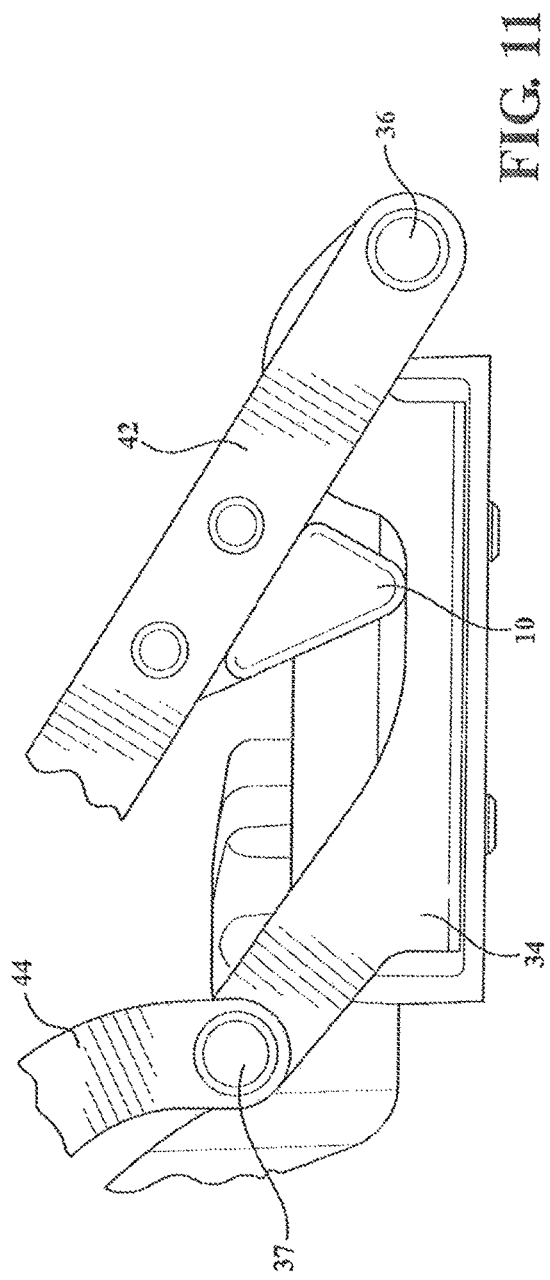

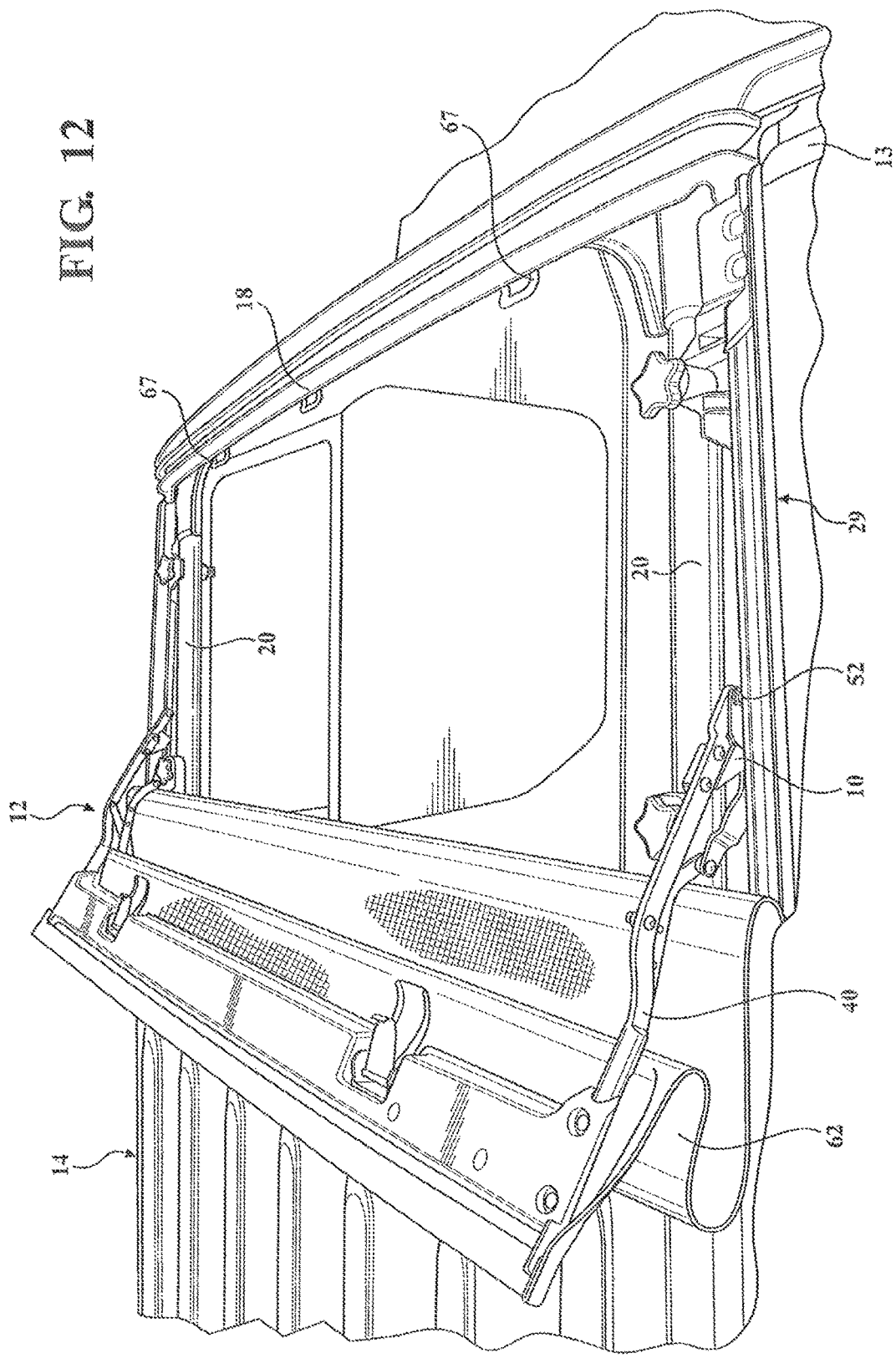

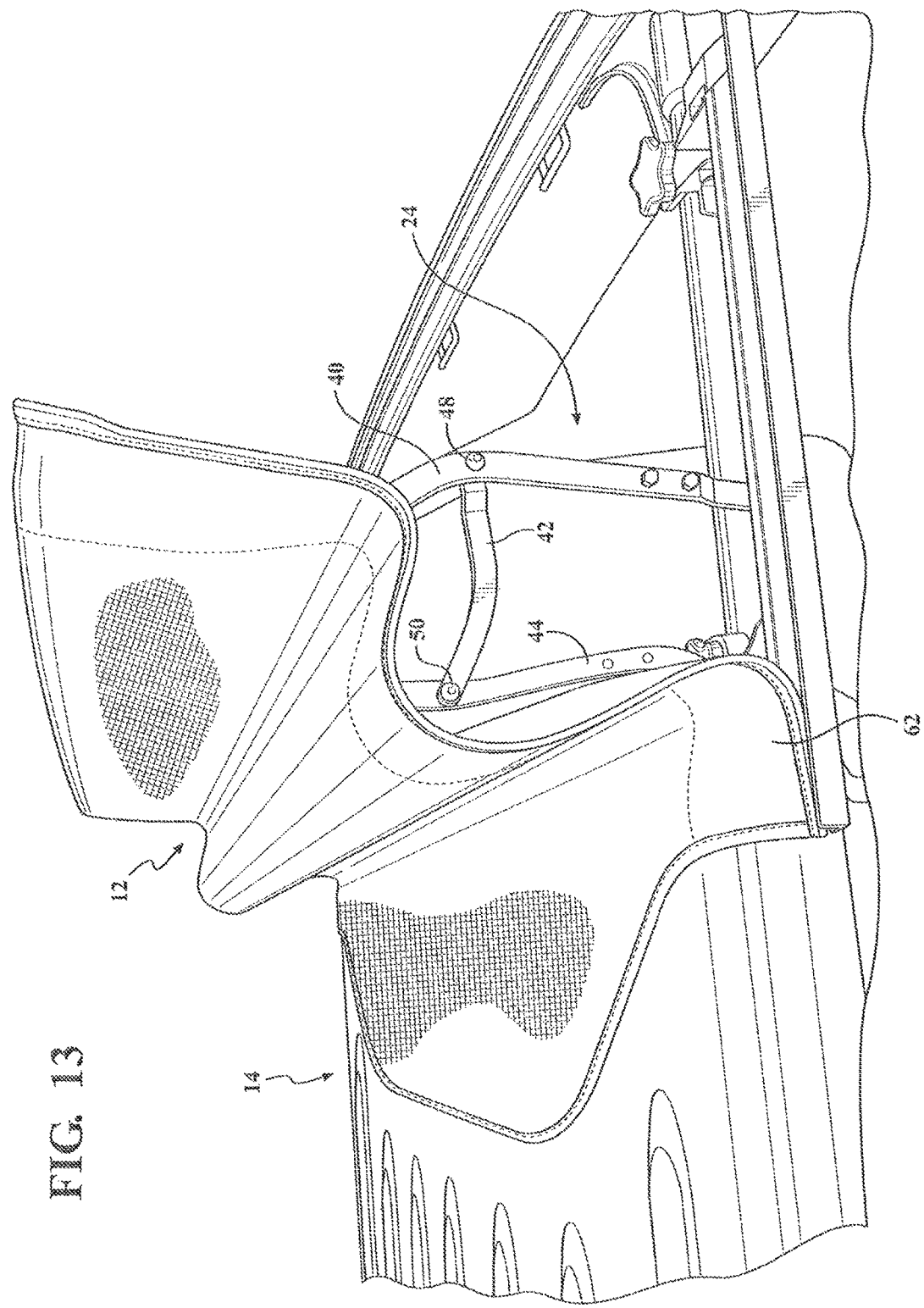

SOFT FRONT COCKPIT COVER

CROSS-REFERENCE TO RELATED APPLICATIONS

The instant application is a continuation of U.S. patent application Ser. No. 15/276,386, filed Sep. 26, 2016, which is a continuation-in-part of U.S. patent application Ser. No. 14/831,414, filed Aug. 20, 2015, now U.S. Pat. No. 9,539,888, and a continuation-in-part of U.S. patent application Ser. No. 14/808,011, filed Jul. 24, 2015, now U.S. Pat. No. 9,517,684, which U.S. patent application Ser. No. 14/831,414 is a continuation-in-part patent application of U.S. patent application Ser. No. 14/243,359, filed Apr. 2, 2014, now U.S. Pat. No. 9,139,073, which claims the benefit of U.S. Provisional Application No. 61/807,506, filed Apr. 2, 2013, and U.S. patent application Ser. No. 14/808,011 is a continuation patent application of U.S. patent application Ser. No. 14/243,359, filed Apr. 2, 2014, now U.S. Pat. No. 9,139,073, which claims the benefit of U.S. Provisional Application No. 61/807,506, filed Apr. 2, 2013, and U.S. application Ser. No. 15/276,386 is a continuation-in-part of U.S. application Ser. No. 15/128,773, filed Sep. 23, 2016, which is a 371 of international Application No. PCT/US2015/022716, filed Mar. 26, 2015, which claims the benefit of U.S. Provisional Application No. 61/970,463, filed Mar. 26, 2014. The disclosures of the above applications are incorporated herein by reference.

FIELD OF THE INVENTION

The present invention relates to a foldable roof assembly having a soft panel top cover that seals against a hard top portion of the roof.

BACKGROUND OF THE INVENTION

Foldable stowable roof soft tops are commonly used in sport-utility vehicles for recreational purposes. The foldable roof is typically moved between a stowed position, and a deployed position. When in the deployed position, the foldable roof protects the occupants of the vehicle from various weather conditions. The foldable roof also includes various sections which are made of a clear material to essentially function as a window, allowing the occupant of the vehicle to see outside of the vehicle. However, there are occasions where the weather is pleasant, and it is desired by the occupants of the vehicle to move the foldable roof to an open position such that the vehicle essentially functions without part of a roof or essentially functions without a roof, and the passenger compartment of the vehicle is exposed to the atmosphere. This allows the occupants of the vehicle to enjoy more favorable weather conditions while driving.

An alternative to the convertible soft top is to use a hard top that is bulky and does not provide any open air feel without removing the entire top. If the entire hard top is removed, it then must be stored, which is often difficult because of the size of the top. Other convertible roofs use a hard top that is large and bulky and does not provide any open air feel without removing two front top panels, which is also laborious, difficult, time consuming, and ergonomically disadvantageous. If one or more of the front top panels are removed, they then must also be stored, which is often difficult because of the size weight of the panels. While this will give the occupant an open air feel, the panels are large and bulky. If the occupant wants to gain the open air feel they need to exit the vehicle and remove the panels using multiple knobs and latches and then store the panels. This makes for a time consuming operation as well as a potential storage issue due to the size of the panels. They are also hard to handle due to their size and weight and due to the fact they must be installed and removed over the operators head. In the event of inclement weather, the panels also cannot be quickly put back in place.

Accordingly, there exists a need for a more manageable and easily foldable top made of soft material to provide a top that can be opened quickly to provide what is often referred to as an open air feel, where a portion of the top of the roof is moved from a closed or deployed position to an open or stowed position exposing a portion of the inside vehicle cockpit/passenger compartment to the outside without removing the top.

SUMMARY OF THE INVENTION

The present invention is directed to a foldable roof assembly having a soft panel top assembly that is in sealing engagement with a hard top portion of the roof. The soft panel top assembly has a pivotal portion that is lightweight and folds back without the operator needing to leave the vehicle to give the occupant a quick and easy sunroof/open air feeling in the front cockpit. This is done more easily than with typical two-panel hard top systems that are more time consuming to disengage from the vehicle and are bulky to handle and remove. The present invention also eliminates storage issues since the soft panel top folds back rather than having to be removed entirely and stored as with conventional hard top panels.

The soft panel top assembly has two door rails connected to side sport bars of the vehicle providing a sealing surface for the doors of the vehicle as well as pivot points for the pivotal portion of the soft panel top assembly. The soft panel top assembly has two side rail linkage assemblies connected to a first bow member that is secured to a windshield frame with quick release latches. Each side bow linkage assembly is connected to opposing ends of a fixed bracket connected to the respective door rail creating the pivot points with the use of the brackets. The soft panel top assembly includes a rear header that is a closeout for sealing engagement with an existing seal of the hard top roof portion. The soft panel top assembly is made lightweight by using a lighter rear header, e.g., rear header closeout that is a wireframe and/or lightweight molded section(s), and by using minimal framing and mostly soft goods. This further helps with ease of installation and ease of cycle efforts of the pivotal portion. Further, the assembly is mountable to the vehicle without any modification, drilling of holes, or any other change to existing hardware and structure to the vehicle other than the removal of the manufacturers existing front cockpit panels.

In another embodiment, the rear header portion of the soft panel top assembly includes at least one bulb seal. When the rear header portion is installed on the vehicle the existing seal of the hard top roof portion is compressed, and the bulb seal of the soft panel top assembly contacts at least one surface of the hard top roof portion, the existing hard top seal, and also a binding edge of the rear header portion. This creates a weatherproof seal between the soft and hard top portions. At least one tertiary seal is also provided along the length of the rear header portion as a back-up weather resistant seal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 7 is a side elevation view of the soft panel top cover assembly of FIG. 1 in an open position;

FIG. 9 is a side elevation view of the soft panel top cover assembly of FIG. 1 in a closed position;

FIG. 10 is a side elevation view of a side rail linkage assembly in a closed position;

FIG. 11 is an enlarged side elevation view of the side rail linkage assembly in an open position;

FIG. 12 is a perspective view of the soft panel top cover assembly in an open position;

FIG. 13 is a perspective view of the soft panel top cover assembly showing the pivotable portion in a partially open position;

DETAILED DESCRIPTION OF THE PREFERRED EMBODIMENTS

Figure 1:
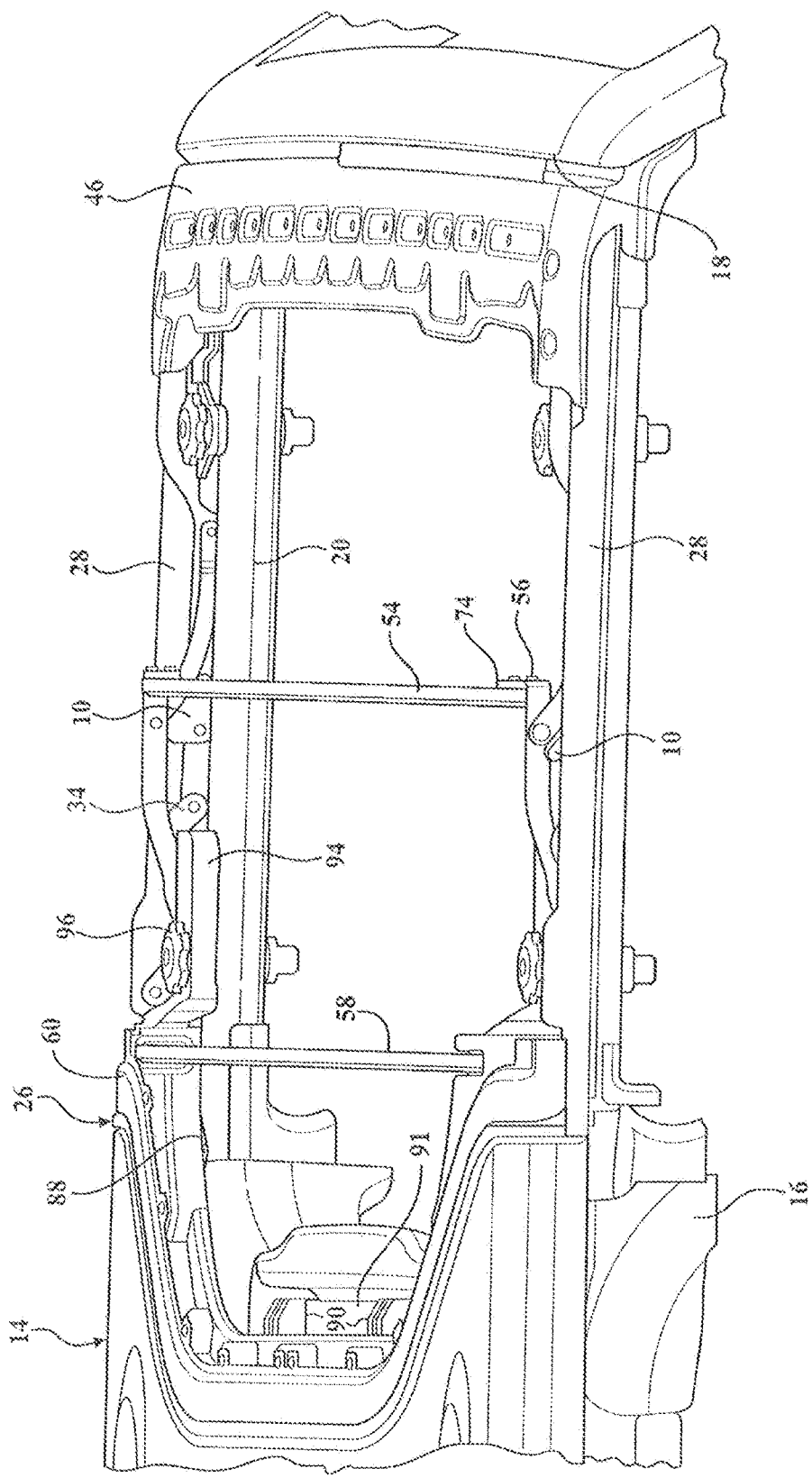
FIG. 1 is a perspective view of a soft panel top cover assembly in a closed position with the fabric cover removed for clarity connected to a vehicle and in sealing engagement with a hardtop portion, in accordance with the present invention.
Figure 2:
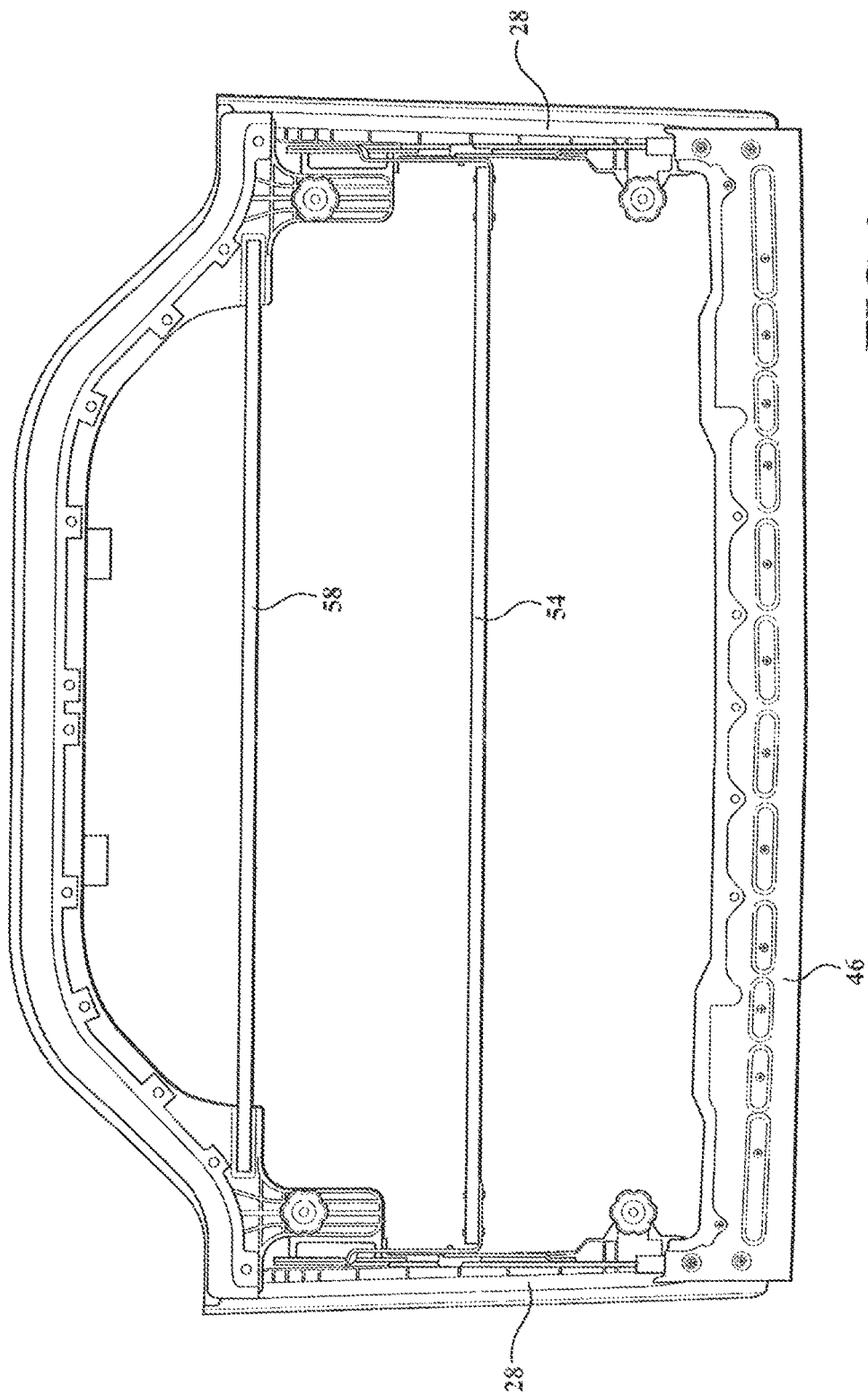
FIG. 2 is a top plan view of the soft panel top cover assembly of FIG. 1.
Figure 3:
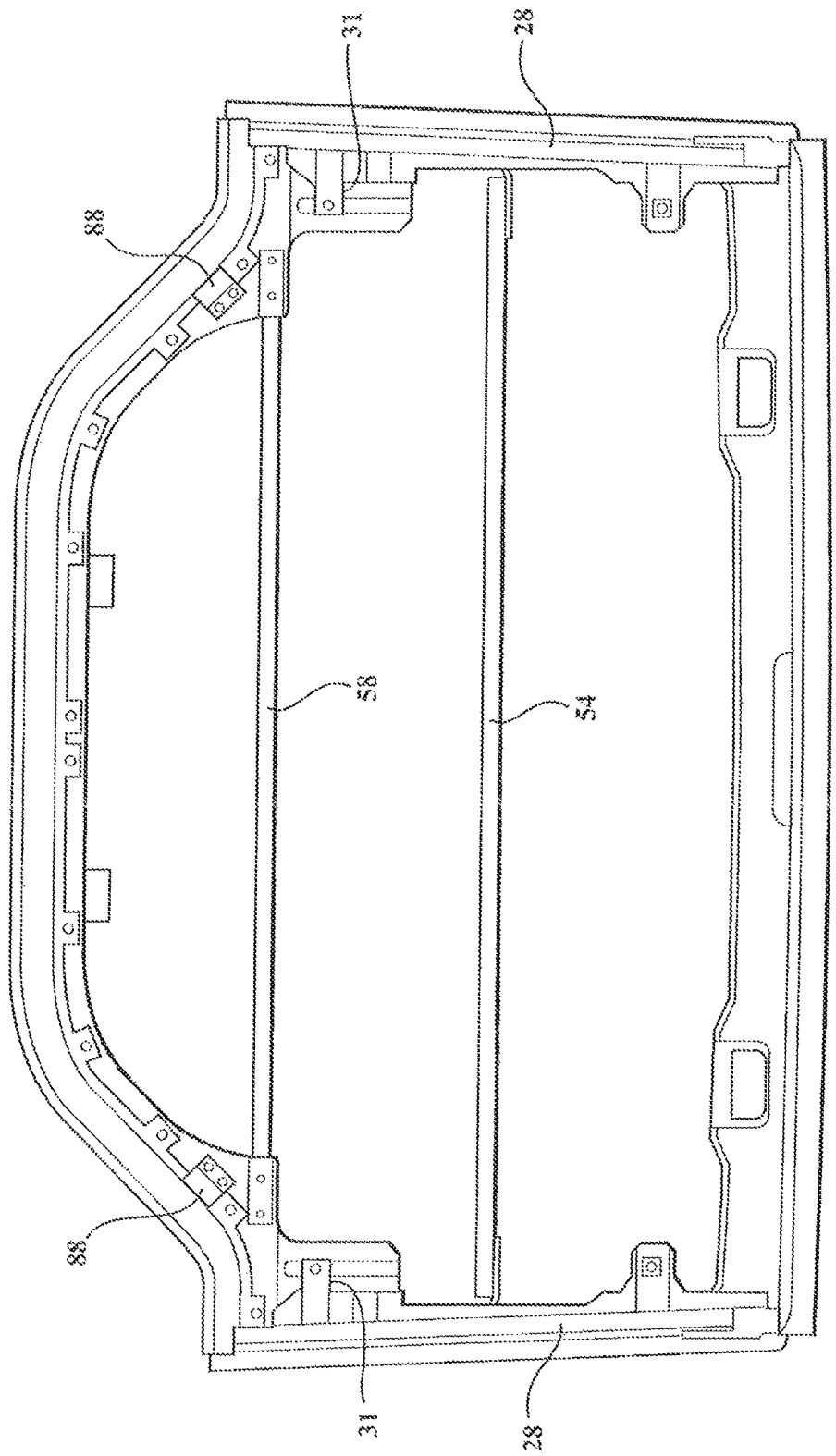
FIG. 3 is a bottom plan view of the soft panel top cover assembly of FIG. 1.
Figure 4:
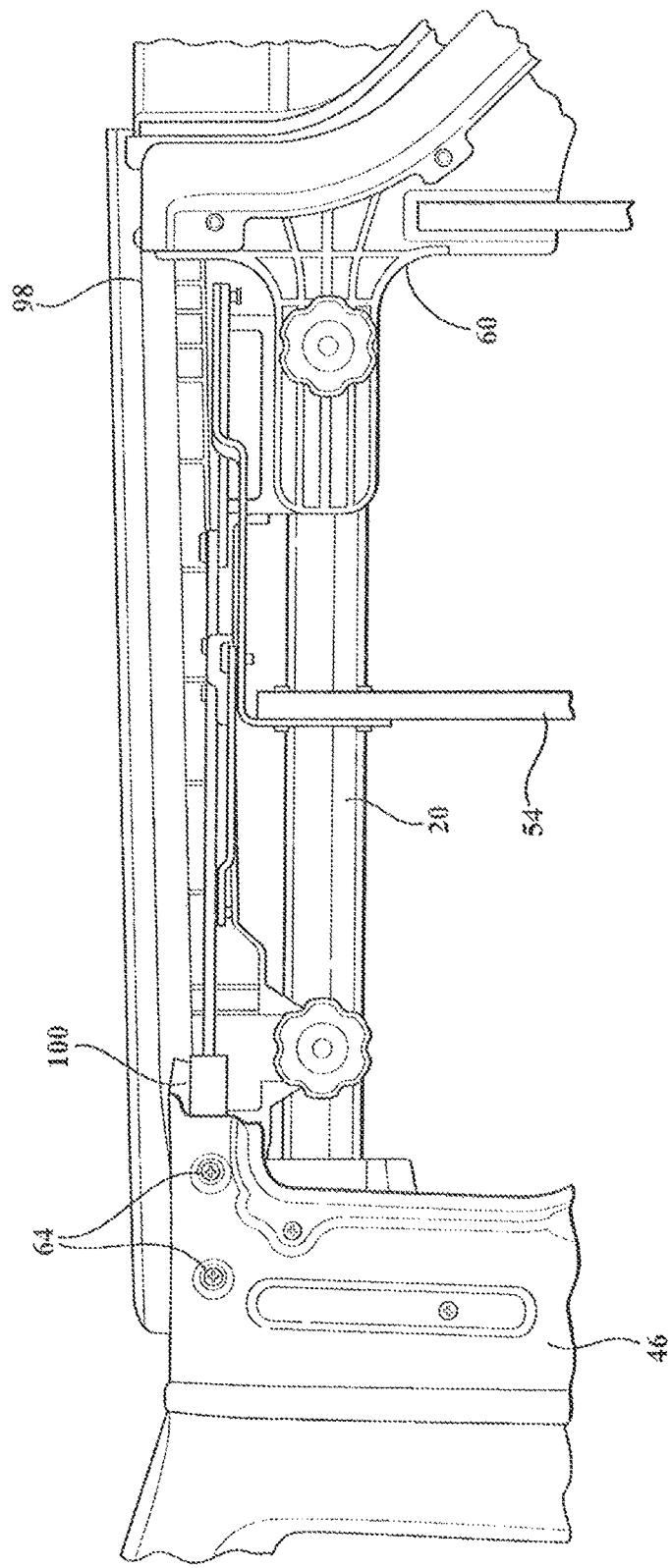
FIG. 4 is a top plan view of the soft panel top cover assembly of FIG. 1 in a closed position.
Figure 5:
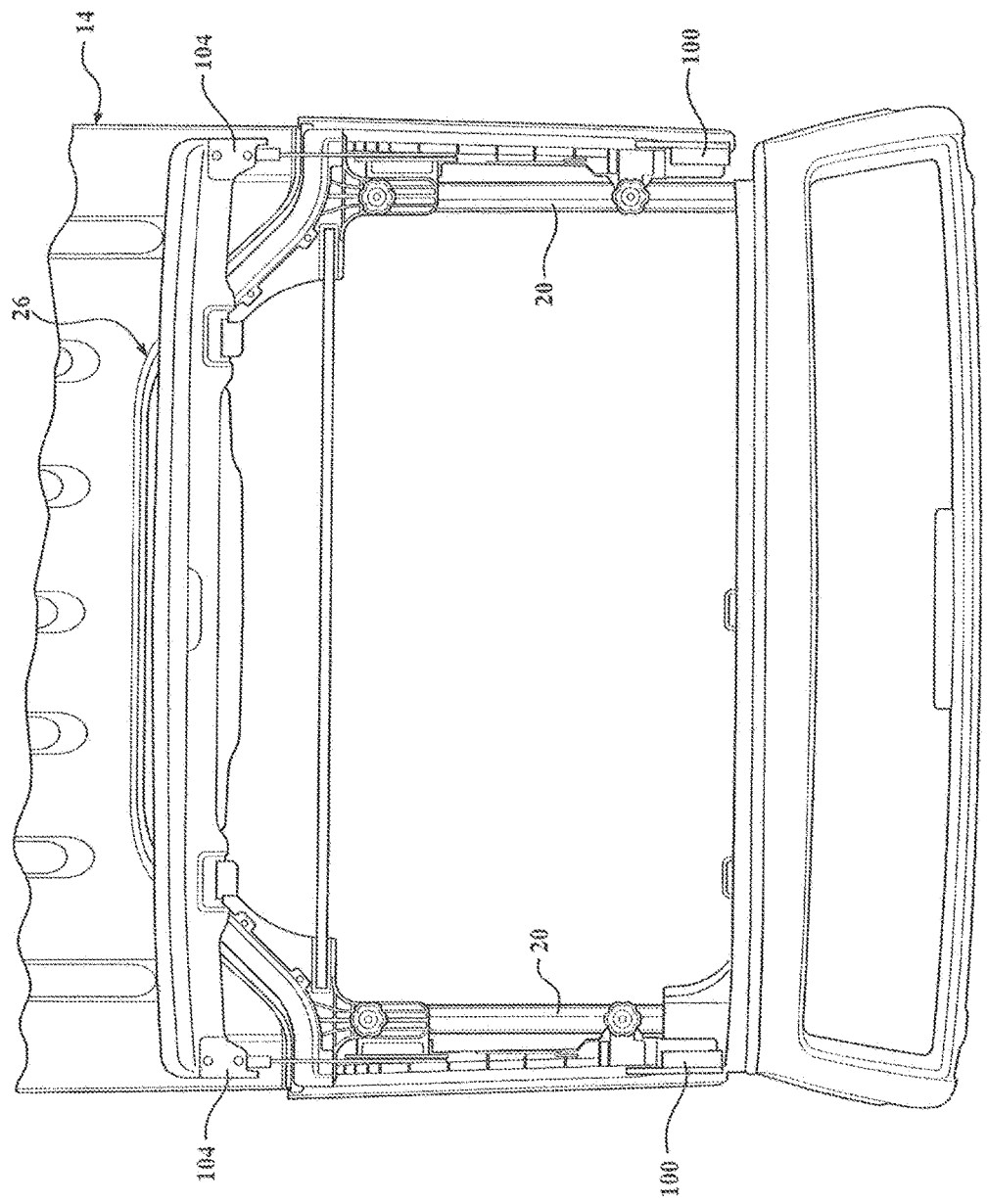
FIG. 5 is a top plan view of FIG. 1 with the soft panel top cover assembly shown in an open position.

The following description of the preferred embodiment(s) is merely exemplary in nature and is in no way intended to limit the invention, its application, or uses.

Referring generally to FIGS. 1-16, there is provided a soft panel top assembly generally shown at 12 that is foldable and sealable with a hard top roof portion generally shown at 14. The soft panel top assembly 12 is connected to a vehicle 16. The vehicle 16 includes a windshield frame 18 with side members 20, e.g., sport bars, extending therefrom and a cross bar or cross member 91 operably connecting the side members 20 substantially adjacent the rear of the driver/passenger compartment.

The soft panel top assembly 12 folds back to give the occupant a quick and easy open air effect, e.g., lightweight and easily operated at a short interval stop, without completely removing the soft panel top assembly 12 from the vehicle 16. Folding the soft panel top assembly 12 between a closed position and an open position is also achievable without the occupant needing to leave the vehicle and eliminates removal and storage of roof panels from the vehicle. Once cycled to the open position, the soft panel top assembly 12 also does not require strapping the assembly down to maintain open air positioning. Further, the soft panel top assembly 12 includes built in stops 10, e.g., bump stops, to prevent over cycling past the desired open position.

The soft panel top assembly 12 has a pivotal portion indicated generally at 24 (FIGS. 7 and 13) for pivoting the soft panel top assembly 12 between the deployed or closed position and a stowed or open position. The assembly 12 geometry generally follows the hardtop 14 contours and seals against the hardtop's bulb seal. When the soft panel top assembly 12 is cycled between the closed/open position, the soft panel top assembly 12 remains in the sealing engagement with the hard top roof portion's 14 bulb seal, generally indicated at sealing portion 26. When the soft panel top assembly 12 is in the closed position the soft panel top assembly 12 also seals with the vehicle windshield frame's 18 bulb seal.

The soft panel top assembly 12 has at least two door rails 28 each operably connected to a respective side sport bar 20 of the vehicle 16. The door rails 28 provide a sealing surface shown generally at 29 for the driver/passenger doors 13 of the vehicle 16 as well as pivot points for the pivotal portion 24 of the soft panel top assembly 12. Each door rail 28 has a plurality of clamping surfaces (FIG. 6), including, at least one pair of clamping surfaces 30 forming an upper surface extending inwardly over the top of the sport bar 20 and a bottom surface extending inwardly under the bottom of the sport bar 20. The pair of clamping surfaces 30 attach the front portion of the door rails 28 to the vehicle 16 using threaded mushroom knob fasteners 32 extending through the pair of the clamping surfaces 30 with the sport bar 20 sandwiched therebetween. Another of plurality of clamping surfaces is a rear clamping surface 31 extending inwardly under the bottom of the sport bar 20 to attach the rear portion of the door rails 28 to the vehicle 16 using threaded knob fasteners extending through the rear clamping surface 31 and rear header, as will be explained in greater detail below, with the sport bar 20 sandwiched therebetween.

At least one bracket 34 is fixedly connected by fasteners to both of the two door rails 28 to pivotably connect the pivotal portion 24 to the door rails 28. The brackets 34 provide at least a forward pivot point 36 and rearward pivot point 37 for the pivotal portion 24 of the soft panel top assembly 12.

The pivotal portion 24 of the soft panel top assembly 12 has two side rail linkage assemblies generally shown at 38 (FIG. 10), each including the bracket 34, a first link 40, a second link 42 and a third link 44. The first link 40 is fixedly connected to a header 46 or first bow member. The other end of the first link 40 is pivotably connected to the bracket 34 at the forward pivot point 36. The second link 42 is pivotably connected to the first link 40 at a third pivot point 48. The other end of the second link 42 is pivotably connected to the third link 44 at a fourth pivot point 50. The third link 44 is also pivotably connected to the bracket 34 at the rearward pivot point 37.

A bushing and screw arrangement 52 provides for all of the respective pivotal connections such that the side rail linkage assemblies 38 freely pivot to allow the top to be cycled open or closed. However, alternative pivot joint mechanisms can be used without departing from the scope of the invention depending on the particular application.

The pivotable portion 24 also has a first fabric management bow 54 fixedly connected to the third links 44 by a plurality of fasteners 56. The soft panel top assembly 12 is also provided with a second fabric management bow 58 fixedly connected to a rear header portion 60. The second fabric management bow 58 does not move with opening/closing of the assembly 12. Rather, the second bow 58 is operably connected with fasteners, e.g. bolted, in sockets or recesses formed in the rear header 60. The first and second management bows 54, 58 extend in the cross car position. The combination of linkage assemblies 38 with the fabric management bows 54, 58 manages the top cover 62 as the soft panel top assembly 12 folds to the open position, which is yet another significant advantage (FIGS. 12-13). The fabric management bows 54, 58 also minimize fabric movement in the closed position, which will act to alleviate wind flap noise, in addition to managing fabric during operation and in the open position.

Preferably, the ends of the first link 40 of the side rail linkage assemblies 38 extend into the first bow member 46 and are secured thereto with a second fastener 64. At least one fastener 64 is used which in this embodiment is a nut and bolt combination, but it is within the scope of the invention that other fasteners, such as rivets, may be used as well.

The first bow 46 is adapted for releasable attachment to the windshield frame 18 for opening and closing the soft panel top assembly 12. The first bow 46 has at least attachment mechanisms 66, e.g., latches or other suitable attachment mechanism, connected thereto that have a hand actuated clamping arrangement to selectively connect to the windshield frame 18. The first bow 46 is preferably molded plastic with steel reinforcement on the bottom and comprises two attachment mechanisms 66, most preferably, latches, which when in the closed position attach to opposing features, e.g., metal loops 67, generally located under the visors of the vehicle, and when cycling to the open position, travel with the first bow 46. The attachment mechanisms 66 provide for securing closure of the top to the existing windshield frame 18 and are readily released by an operator for opening of the soft panel top assembly 12.

In accordance with a preferred embodiment, the third link 44 has at least one first curved portion generally indicated at 68 (FIG. 10), and, the first link 40 has at least one second curved portion generally indicated at 70. Generally, the bracket 34 has at least one raised portion generally indicated at 72 to position the rearward pivot point 37 at a predetermined height. The linkage assemblies 38 also include the limiting stop 10 feature operable to keep the soft panel top assembly 12 a predetermined distance away from the hard top 14. The combination of the linkage assembly 38 geometry, link geometries, and limiting stops 10 coordinate to provide the height needed for the pivotal portion 24 to lay above and near the hard top portion 14 without touching the top 14 when in the open position. Thus, there is a predetermined clearance generally shown at "A" between the linkage assembly 38 and the hard top portion 14 and a predetermined clearance indicated generally at "B" between the third link 44 and hard top portion 14 to prevent scratches or damage.

The limiting stop 10 is generally triangular, e.g., generally a right-angle triangle shape and/or scalene triangle, and is connected to the first link 40 for movement with the first link 40 between a stowed stop condition (FIG. 10) and deployed stop condition (FIG. 11) where a vertex of the limiting top 10 contacts the fixed bracket 34 to hold the first link 40 at an angle for keeping the pivotal portion 24 off the surface of the hard top portion 14.

The first fabric management bow 54 is connected to an inwardly projecting attachment portion 74 of the first link 40 by the plurality of fasteners 56. The fasteners used in this embodiment are a nut and bolt combination, but it is within the scope of the invention that other fasteners, such as rivets, may be used as well. The top cover 62 is connected to the first fabric management bow 54. In accordance with one embodiment, the first fabric management bow 54 is a round bow that slides into a pocket sewed into the top cover 48. In accordance with another embodiment, an extrusion is stitched or sewn onto the top cover 48.

In accordance with a preferred embodiment the first fabric management bow 54 and second fabric management bow 58 have a channel 76 (FIG. 10) along the length of the bows 54, 58 that is open on at least one end to receive an extrusion. The extrusion is connected to the top cover 62, e.g., bonded or adhered thereto with adhesive, and/or sewn, etc, and the extrusion is slid into the channel 76. The channel 76 is generally circular in cross section, or any other alternative cross sections suitable for attaching the cover 62 to the bows 54, 58.

Figure 15:
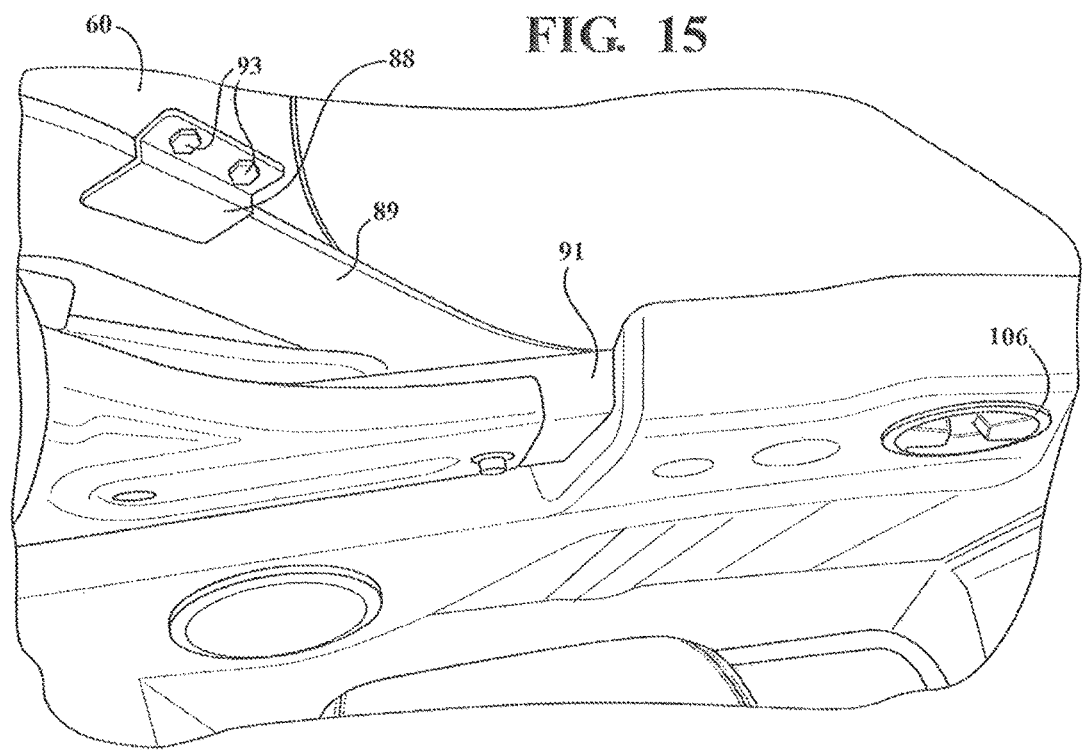
FIG. 15 is a perspective view of an attachment bracket coupled to a hardtop flange and a rear header of the soft panel top cover assembly.
Figure 16:
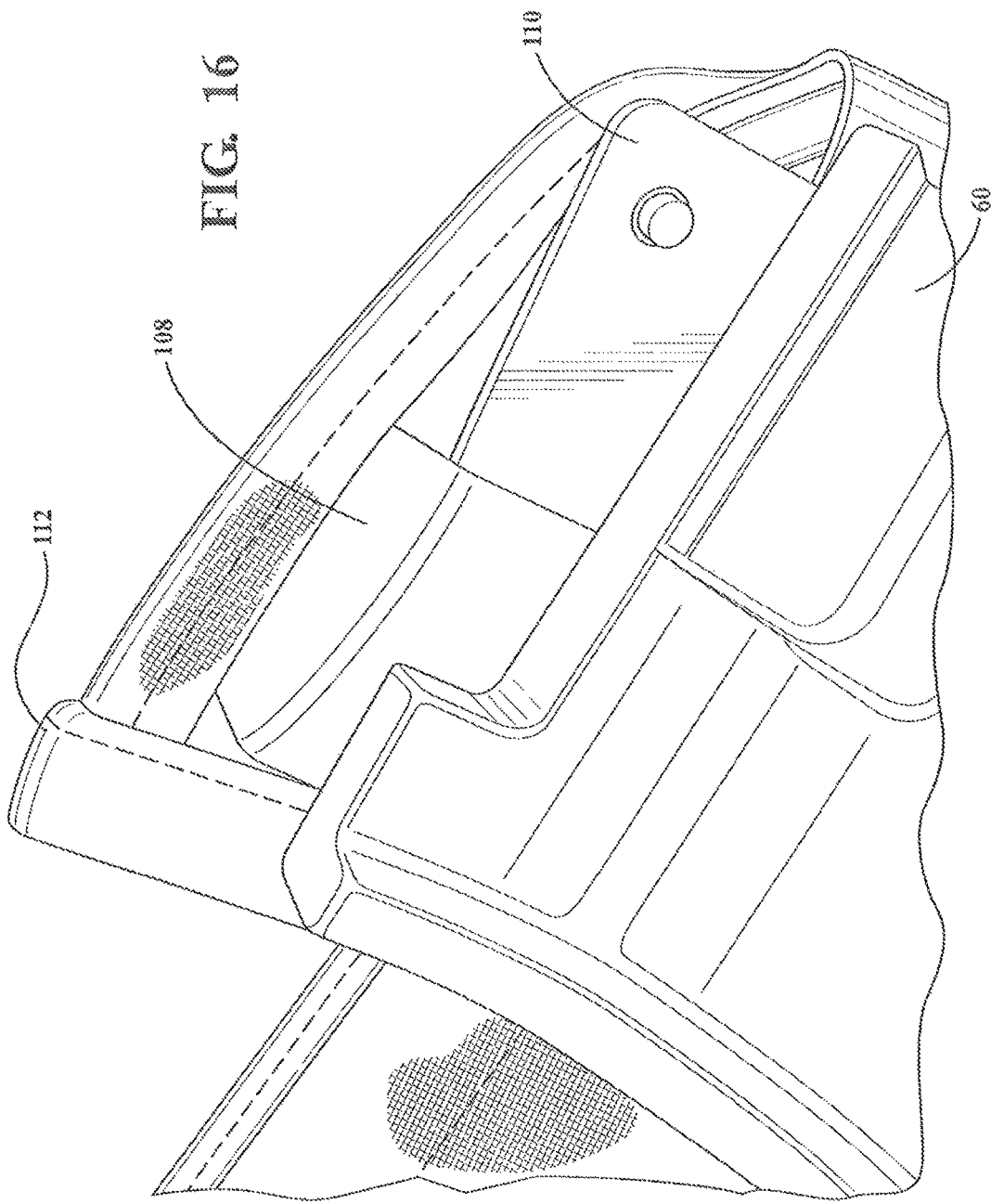
FIG. 16 is a perspective view of the cover coupled to the rear header, in accordance with an embodiment of the present invention.
Figure 17:
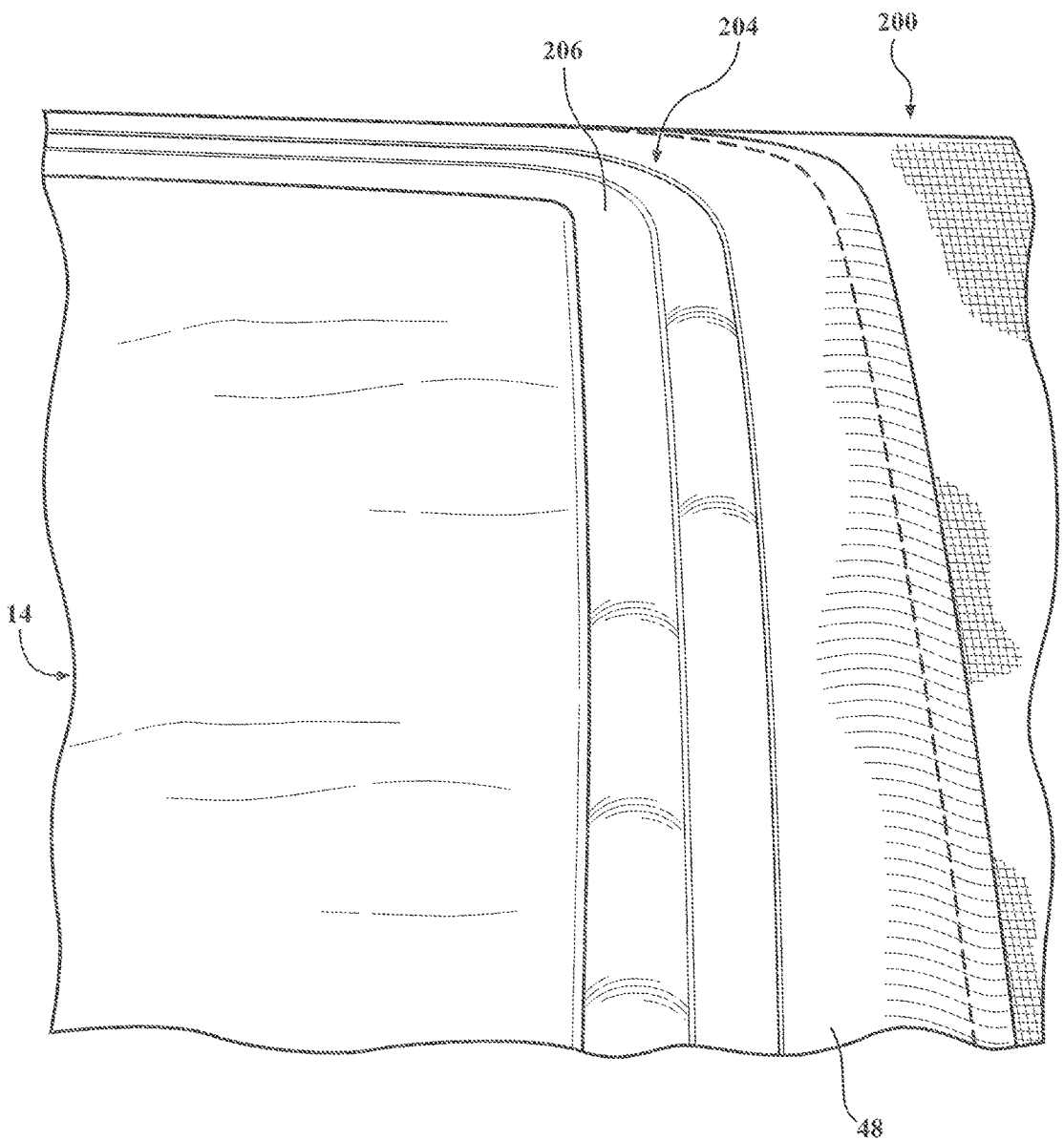
FIG. 17 is a perspective view of a portion of a soft panel top cover assembly that is connected to the vehicle having a bulb seal in sealing engagement with a hardtop portion, in accordance with another embodiment of the present invention.
Figure 18:
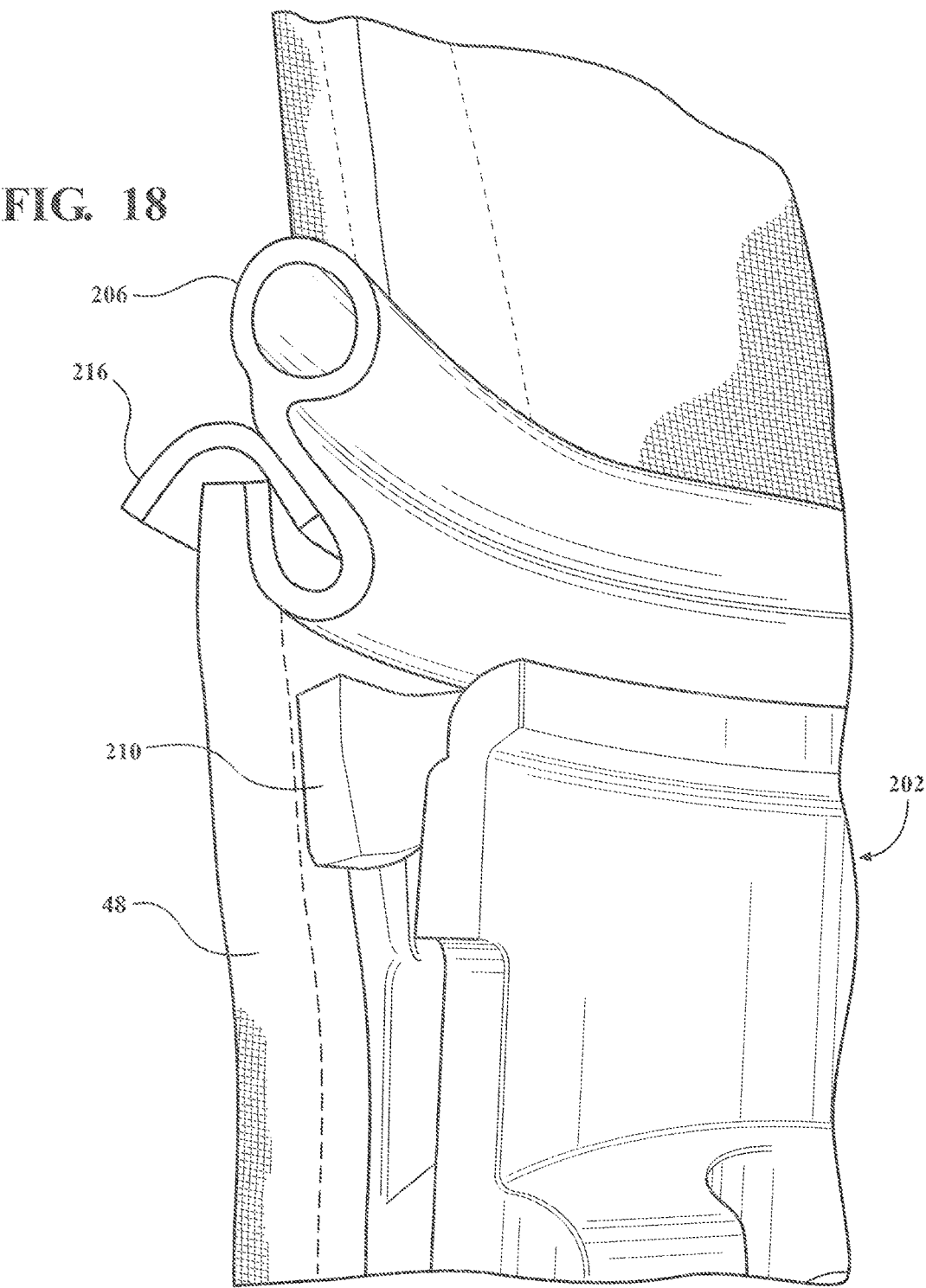
FIG. 18 is a bottom perspective view of a rear header assembly connected to a soft top cover of the soft panel top cover assembly and depicting the bulb seal of FIG. 17 and a tertiary seal, in accordance with the present invention.

A first fabric management bow 78 having a preferred channel 80 cross section is illustrated in FIG. 15 according to another embodiment. The extrusion includes a larger portion 84, e.g., larger diameter bulbous portion, received within an inner chamber of the channel 80 such that the extrusion 84 cannot work its way out laterally through a smaller opening 82 of the channel 80. At least one, preferably two, flanges 86 generally extend from the larger bulbous portion for attachment to the top cover 62, e.g., bonded or adhered thereto with adhesive, and/or sewn. After the cover 62 is attached the extrusion 84 is slid into the channel 80 along the length of the channel 80 and the first fabric management bow 78 is then connected to the attachment portion 74 of the first link 40 and the plurality of fasteners 56 applied. The second fabric management bow 58 is identical in this embodiment to the first fabric management bow 78.

Depending on the application the extruded materials are generally polypropylene, polyethylene, flexible polyvinyl chloride, structural acrylonitrile butadiene styrene, thermoplastic elastomer of operable densities or other material suitable for making the extrusion (bulb portion and attachment flange). If more than one extruded material is used the extruded materials are compatible materials to melt bond to one another under pressure depending on the application.

The rear header 60 has a plurality of attachment features for coupling to the sports bars 20, cross member 91, and hard top cover portion 14. At least two locating brackets 88 are connected to the bottom of the rear header 60 by at least two fasteners 93 (FIG. 15). The locating brackets 88 interface with the hardtop 14. In particular, the locating brackets 88 have a portion that fits under a portion of the existing hardtop structure at the leading edge flange 89 toward the corners.

At least two feet 90 are integrally formed with the bottom of the rear header 60 and rest on top of the cross member 91. The feet 90 include a locating lip 92 that hangs over the front edge of the cross member 91 generally toward the center of the vehicle. These feet 90 generally set the height with the hardtop 14.

The rear header 60 also includes two attachment members 94 that are integrally formed with the header and attached to the top of opposing sport bars 20 by second mushroom knobs 96. The first and second mushroom knobs 32, 96 are most preferably the same type of knob and interchangeable. The two attachment members 94 are a predetermined length and can be longer or shorter without departing from the scope of the present invention.

Thus, the rear header 60 is operably attached to the sports bars in two locations on the cross member 91, in two locations (1 per side) on the fore/aft sport bars 20, and interfaces with the hardtop 14 using the two locating brackets 88. No modification to the hardtop 14, no drilling of any holes, or changing of any existing components is required. The manufactures front cockpit panels are removed and the soft panel top assembly 12 is installed. In a preferred embodiment, the soft panel top assembly 12 ships as a module except that the two locating brackets 88 are connected to the underside of the rear header 60 and extends to under the hardtop 14 leading edge flange. Alternatively, the brackets 88 are also shipped attached. The process for installation of the soft panel top assembly 12 includes removing existing top and then aligning the clamping surfaces 30 of the two door rails 28 with the sport bars 20 adjacent apertures for the mushroom knobs 32, aligning the attachment members 94 of the rear header 60 on top of the sports bars 20 adjacent apertures for the second mushroom knobs 96, and/or resting the two feet 90 of the rear header 60 on top of the cross member 91. The threaded mushroom knobs 32, 96 are turned to attach the soft panel top assembly 12 to the sport bars 20. The two locating brackets 88 are positioned along the leading edge flange 89 and bolted to the underside of the rear header 60 using pre-drilled holes in the rear header 88. At least two threaded fasteners 106 extend from the bottom of the cross member 91 and/or speaker bar into pre-drilled holes on the underside of the rear header. The knobs clamp against the respective surfaces and have a pin portion extending into the respective components. As the respective knobs are tightened and screwed into the cross member 91 and sports bars 20 of the vehicle 16, the knobs connect the assembly 12 to the vehicle and also press the rear header 60 against the hard top cover seal 26

The rear header 60 is a rear header closeout operable to engage at least one seal existing on the hard top portion 14 to provide a weatherproof seal under compression, e.g., bulb seal, gasket or other suitable seal to prevent leaks between the hard top portion 14 and assembly 12. It is within the scope of the invention to manufacture the rear header 60 as a wireframe (e.g., bent wire frame welded together), lightweight molded plastic, or other suitable lightweight material and configurations and/or combinations thereof suitable to withstand predetermined strength requirements and to sealingly engage with the hard top portion 14, depending on the particular application without departing from the scope of the invention. The rear header 60 is a single piece or plurality of pieces. Most preferably, the rear header 60 has three lightweight molded pieces operably connected together.

In a preferred embodiment, a plastic retainer 108 slides over a metal backing 110 piece connected by a fastener to keep the cover 62 connected on the rear header 60, e.g., the cover is sandwiched. Similarly, the front header 46 has a similar metal backing and plastic retainer connecting the cover 62 to the header 46, e.g., the cover is sandwiched. The cover is also stitched or sewn 112 along edges. The cover 62 or soft skin or top cover of the soft panel top assembly 12 is fabric. The cover 62 is secured to the rear header 60 and front header 46 without the need for snaps.

Most preferably, the seal 26 of the hard top portion 14 is a bulb seal. The seal 26 generally follows the contour toward the front of the hard top portion 14, e.g., a forward projecting stepped portion of the hard top with the seal operably attached along a top surface thereof. The rear header 60 geometry generally follows the hard top portion 14 contours and seals against the hardtop's bulb seal 26.

The soft panel top cover assembly 12 also has a cable assembly 98 located on both side that are fore/aft cables to provide tension along the sides of the fabric (FIG. 9). The cable 98 is operably connected to the header 46 and also to the rear header 60.

Figure 6:
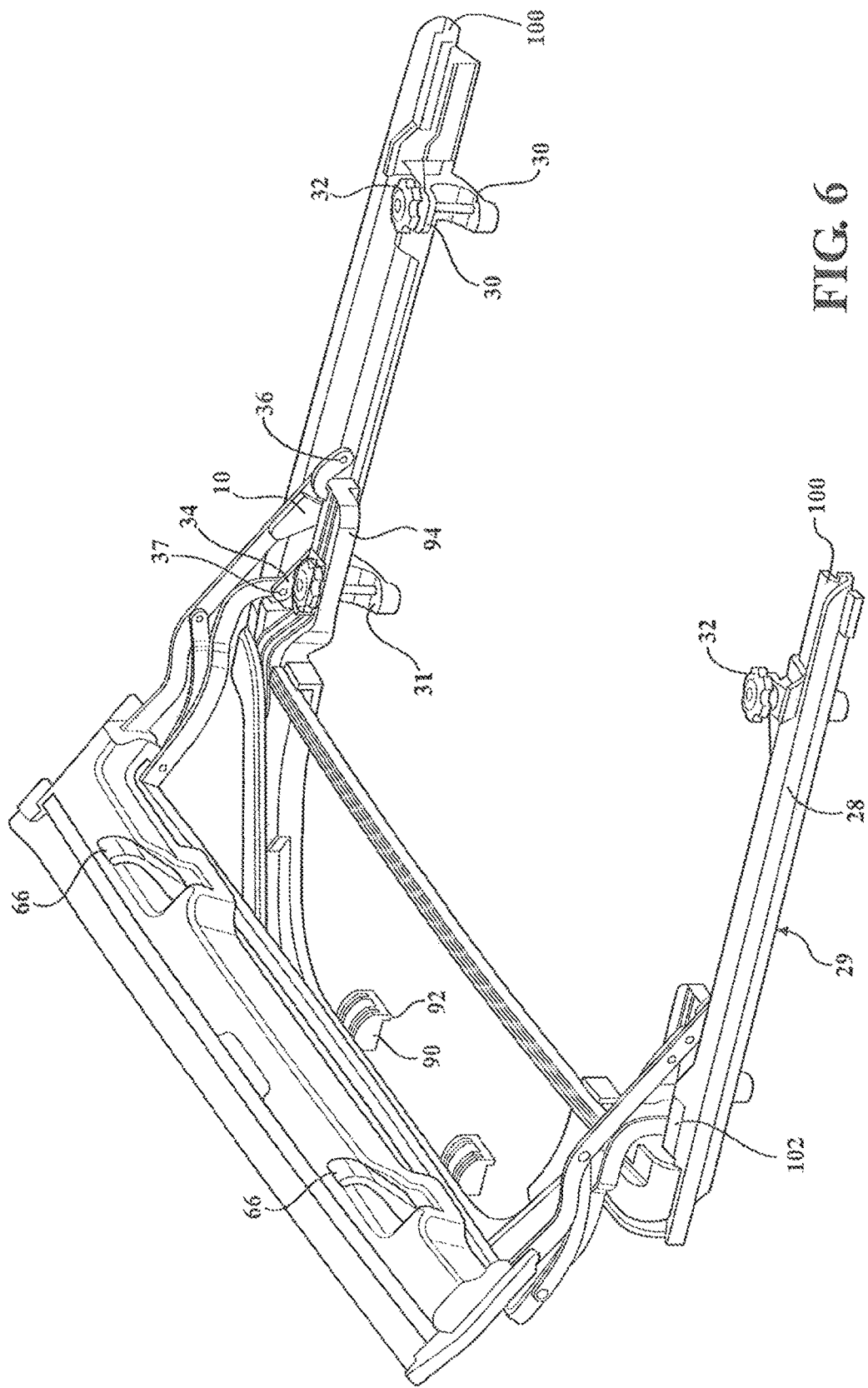
FIG. 6 is a right perspective view of the soft panel top cover assembly of FIG. 1 with a pivotable portion in an open position.
Figure 8:
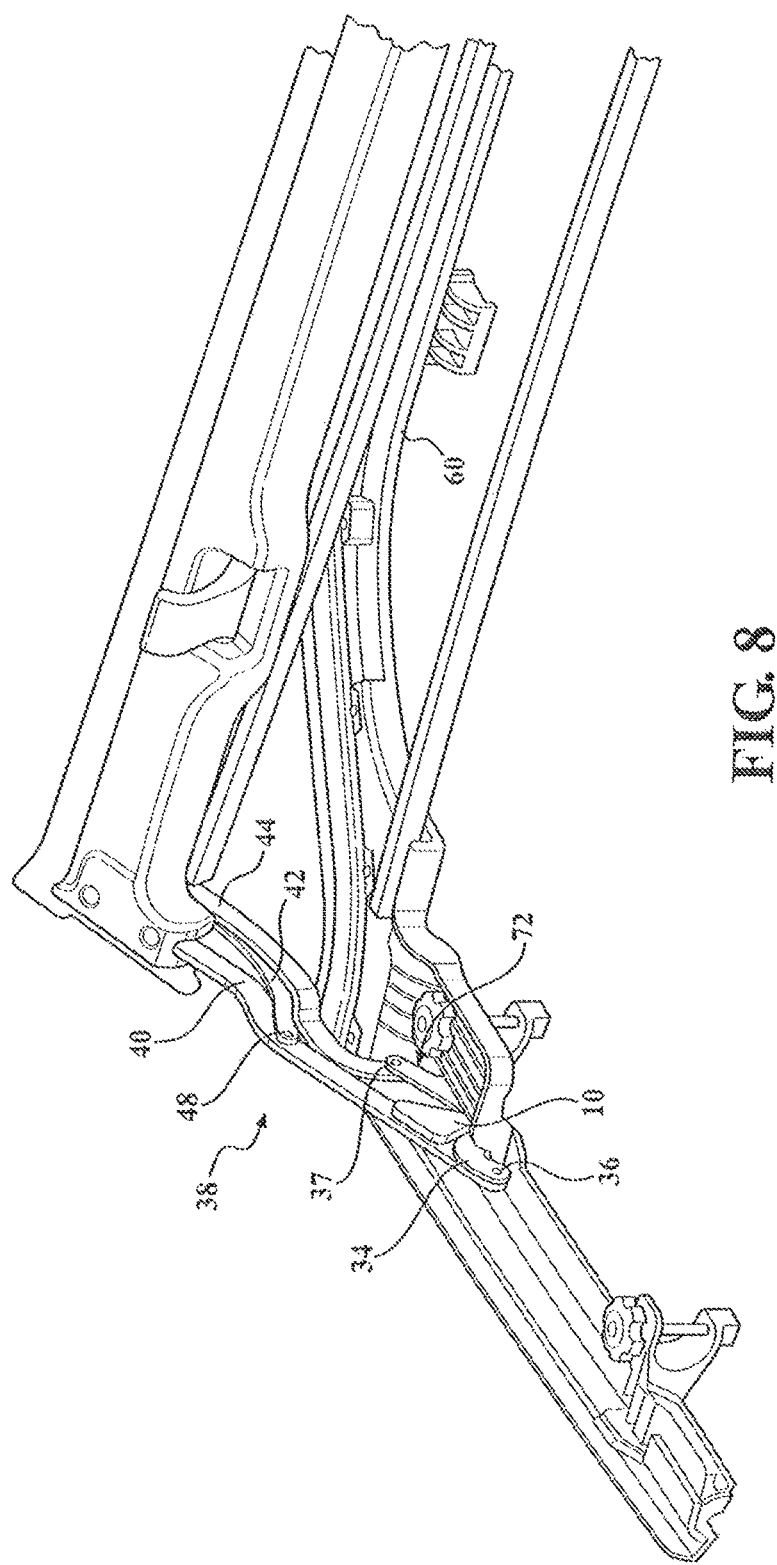
FIG. 8 is a left perspective view of the soft panel top cover assembly in an open position.
Figure 14:
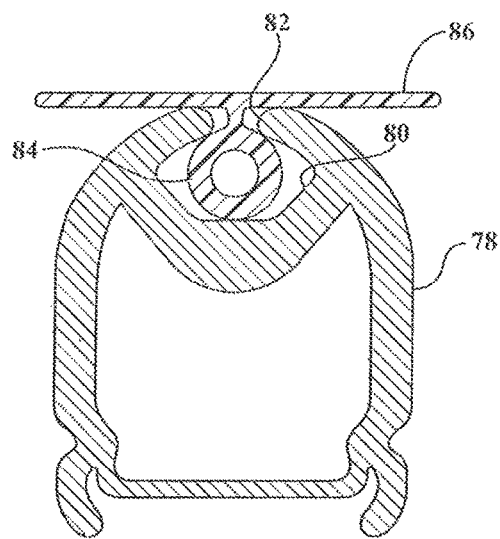
FIG. 14 is a side elevation of a fabric management bow.

The soft panel top cover assembly 12 also has a plurality of seals. At least two front corner seals 100 (FIG. 5) are operably connected, e.g., with adhesive, toward the forward end of the door rails 28 near a windshield seal. At least two front header seals 104 are operably connected, e.g., with adhesive, near both ends of the header 46. At least two rear corner seals 102 are operably connected, e.g., with adhesive, toward the rearward end of the door rails 28 near the rear header 60 (FIG. 6). Optionally, a lip seal is operably connected to the cover 62 along at least the rear edge surface of the rear header 60. By way of example, the lip seal is sewn and/or bonded to the cover 62 and sandwiched between the cover 62 and rear header 60 at the rear of the assembly 12 near the current hardtop seal 26.

The seals 100,102,104 are an open cell foam, a closed cell foam material, EPDM (ethylene propylene diene monomer), TPE (thermoplastic elastomers), TPV (thermoplastic vulcanizate), etc., a foam rubber, an extruded rubber, a formed/molded rubber mucket, and/or a silicone material. The seals 100,102,104 are preferably foam seals, most preferably soft sponge EPDM closed cell foam. Alternatively, at least one of the pairs of seals 100,201,104 are a rubber mucket which is more robust.

The left half of the soft panel top cover assembly 12 and corresponding features are substantially mirror image/symmetrical to the right half of the soft panel top cover assembly 12 and corresponding features depicted in the figures.

Referring now to FIGS. 17-25, in accordance with another embodiment of the present invention, there is provided a soft panel top assembly 200 similar to the soft panel top assembly 12 in FIGS. 1-16 (e.g., is connected to the vehicle 16, is foldable and sealable with the hard top roof portion 14, and includes the pivotable portion 24 with the two side rail linkage assemblies 38 and fabric management bows 54, 58, the two door rails 28 and the front header 46, etc.). However, the rear header of the soft panel top assembly 200 additionally includes at least one seal, preferably, a sealing system or arrangement with multiple seals. In addition, the soft panel top assembly 200 has a lightweight rear header portion that is a single piece or a plurality of pieces operably connected together.

The soft panel top assembly 200 includes a rear header assembly shown generally at 202 having a sealing system indicated generally at 204 to prevent leaks between the hard top portion 14 and assembly 200. The sealing system 204 includes at least one rear header seal 206, which seals in cooperation with the existing at least one hard top seal 208 on the hard top portion 14. At least one tertiary seal 210 is also provided. The tertiary seal 210 is preferably a continuous strip that runs the length of the rear header 202.

The hard top seal 208 is typically a triangular bulb seal, however, any other seal is contemplated. It is also contemplated that the present invention includes at least one additional seal, e.g., bulbous seal(s), applied to the hard top portion 14 prior to installation of the rear header assembly 202.

The rear header seal 206 is connected to an upper rear header 212 of the rear header assembly 202. The rear header seal 206 is a bulb seal, living hinge seal, and any other seal suitable for sealing engagement with the hard top roof portion 14. At least one retainer 214 is operably connected to the inside rear edge of the soft top cover 48 of the assembly 200 and is located against the inner surface of the upper rear header 212. A portion of the retainer 214 projects rearward to receive at least one binding retainer 216 or binding, generally having a C-shape or U-shape, along the edge of the retainer 214. An attachment portion shown generally at 218 of the rear header seal 206 is held between the retainer 214 and the binding 216. A sealing portion shown generally at 220, preferably a bulb portion, of the rear header seal 206 becomes sandwiched between and seals against a surface 222 of the hard top portion 14 and the binding edge 224.

Most preferably, the retainer 214, binding 216 and rear header seal 206 are continuous parts that generally run the cross car length of the rear header assembly 202 and generally follow the contour of the rear edge of the rear header upper 212. The rear header assembly 202 geometry generally follows the contours of and seals against the hard top portion 14.

Figure 20:
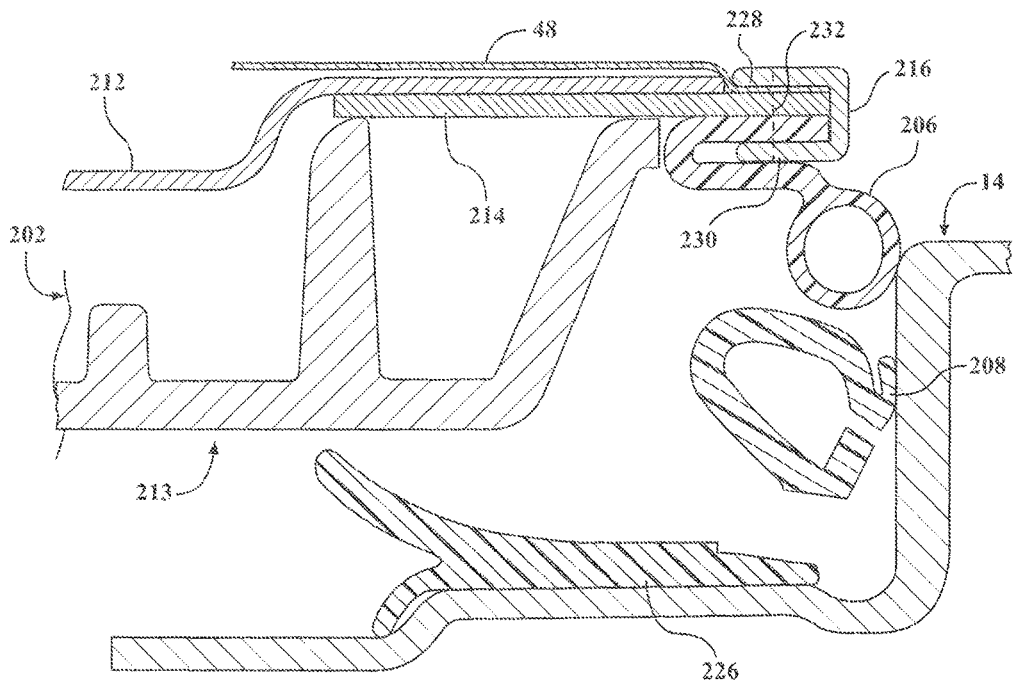
FIG. 20 is a cross sectional view of the rear header assembly of the soft panel top cover assembly depicting the hard top cover seal and bulb seal prior to compression, in accordance with the present invention.
Figure 21:
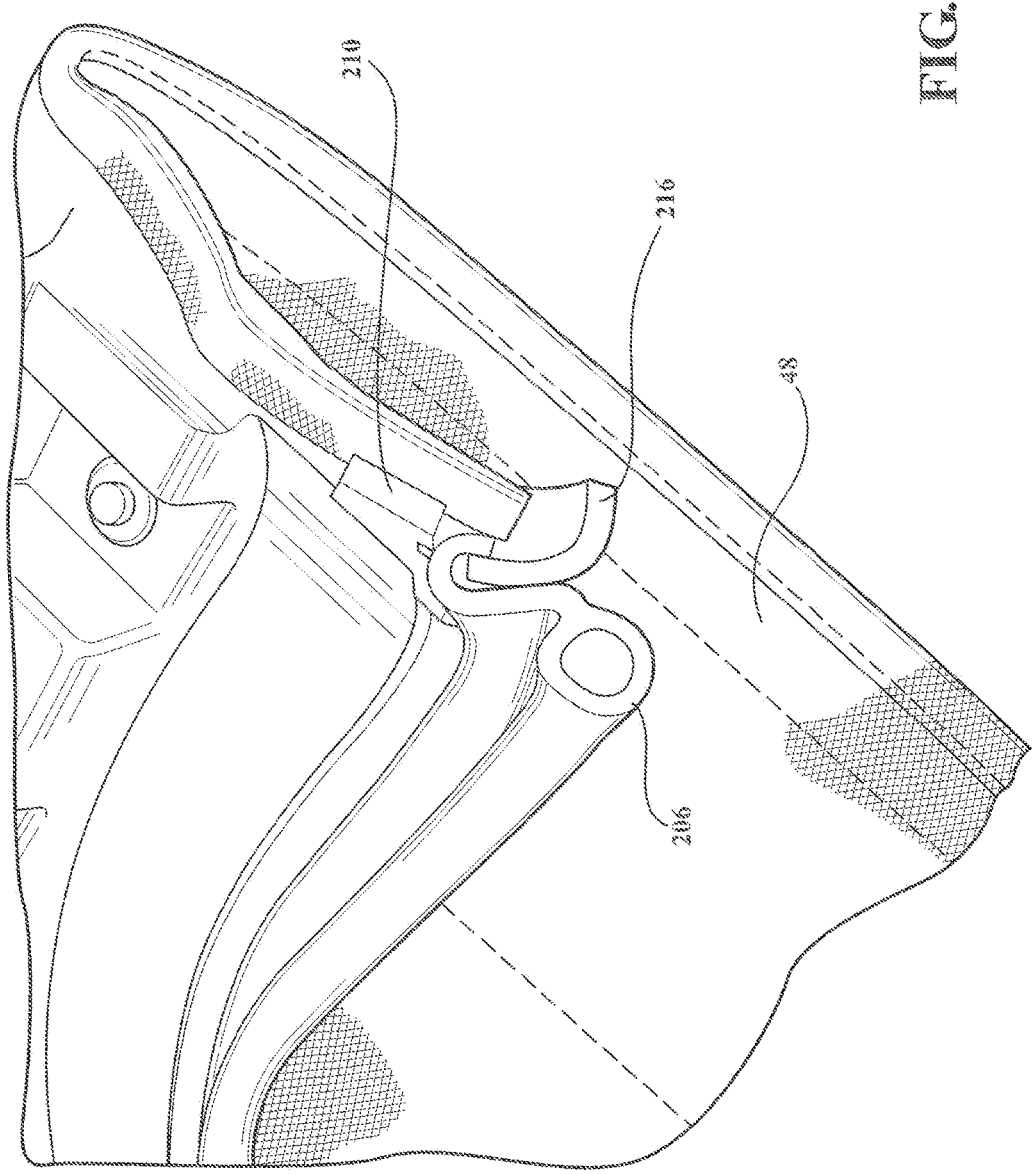
FIG. 21 is a bottom perspective view of the rear header assembly connected to the fabric cover, in accordance with the present invention.

FIG. 20 illustrates a cross sectional view depicting the sealing system 204 before installation of the rear header assembly 202, thus, prior to compression of the hard top seal 208 and at least one other hard top seal 226 by the rear header assembly 202. The top 228 of the binding 216, cover 48 material, retainer 214, rear header seal 206 and the lower section 230 of the binding 216 that sandwiches the components together is depicted. The rear header seal 206 can additionally, or alternatively, be bonded or attached with adhesive, and/or other suitable attachment method without departure from the scope of the present invention. A plurality of fasteners is also contemplated. FIG. 20 also depicts an alternative attachment method where the top and bottom of the binding 228,230, attachment portion of the seal 206 within the binding 216, retainer 214 and cover 48 are sewn together 232. In a preferred embodiment, the rear header seal 206 is held in the desired positions by being sandwiched between parts and with adhesive.

Figure 19:
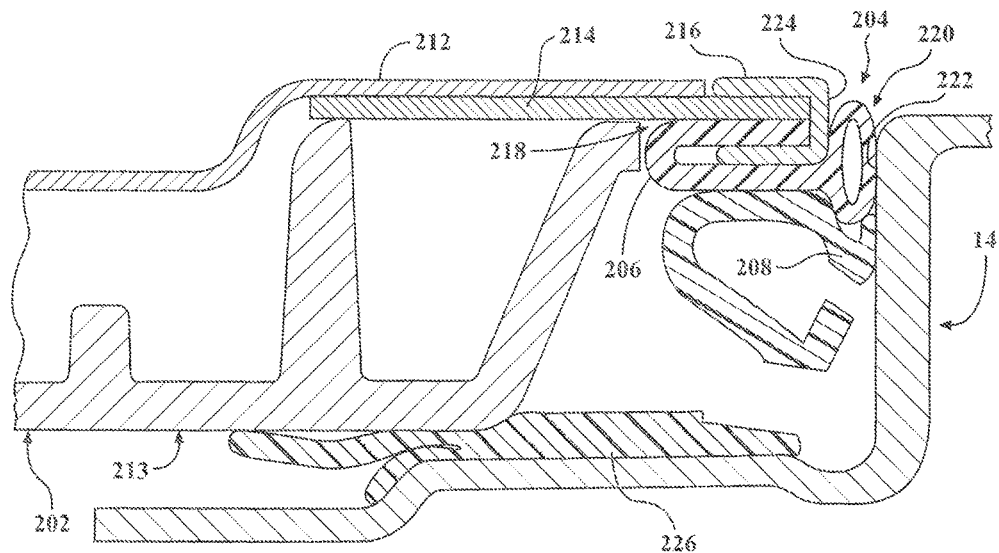
FIG. 19 is a cross sectional view of the rear header assembly of the soft panel top cover assembly in an installed position on the vehicle, with the top cover omitted for clarity, depicting a hard top cover seal of the hard top portion compressed and the bulb seal in a sealing position, in accordance with the present invention.

FIG. 19 illustrates a cross sectional view depicting the sealing system 204 sealing the soft panel top assembly 200 to the hard top portion 14. When the rear header assembly 202 is installed to the vehicle 16 the hard top seal 226, e.g., flange seal, on the hard top portion 14 is compressed by a bottom surface on a rear header lower 213 of the rear header assembly 202. The rear header lower and upper 212,213 are preferably integrally formed. In addition, when the rear header assembly 202 is installed to the vehicle 16 the hard top seal 208, e.g., triangular bulb seal, on the hard top portion 14 is compressed by the rear header assembly 202 which pushes the sealing portion 220, e.g., bulb, of the rear header seal 206 upward between the binding 216 and the hardtop. Thus, once compressed, the sealing portion 220 is in contact with the hardtop surface 222, which is generally a vertical surface, and in contact with the binding edge 224, which is generally a vertical surface, as well as in contact with the hard top seal 208.

The existing hard top seal 208 is rubber. At least the sealing portion 220 of the rear header seal 206 of the present invention is generally less stiff than the hard top seal 208. The rear header seal 206 has a predetermined durometer for meeting the desired sealing with requirements. Having a first durometer, e.g., of a higher durometer, for the attachment portion 218 and a second durometer, e.g., of a lower durometer, for the sealing portion 220 is contemplated without departing from the scope of the present invention.

Generally, the rear header seal 206 is an open cell foam, a closed cell foam material, such as, but not limited to, EPDM, TPE, TPV, etc., a foam rubber, an extruded rubber, a formed/molded rubber mucket, and/or a silicone material. Preferably, the rear header seal 206 is a closed cell foam material. The tertiary seal 210 preferably uses similar material.

The left half of the soft panel top cover assembly 200 and corresponding features are substantially mirror image/symmetrical to the right half of the soft panel top cover assembly 200 and corresponding features depicted in the figures.

The rear header assembly 202 includes a rear header portion 234 that is a single piece or plurality of pieces. The rear header portion 234 is a lightweight header including a wireframe (e.g., bent wire frame welded together), lightweight molded plastic, or other suitable lightweight material and configurations and/or combinations thereof depending on the particular application. Preferably, the rear header portion 234 is three to five pieces, e.g., molded segments, operably connected together. Most preferably, the rear header portion 234 has three lightweight molded pieces operably connected together.

Figure 22:
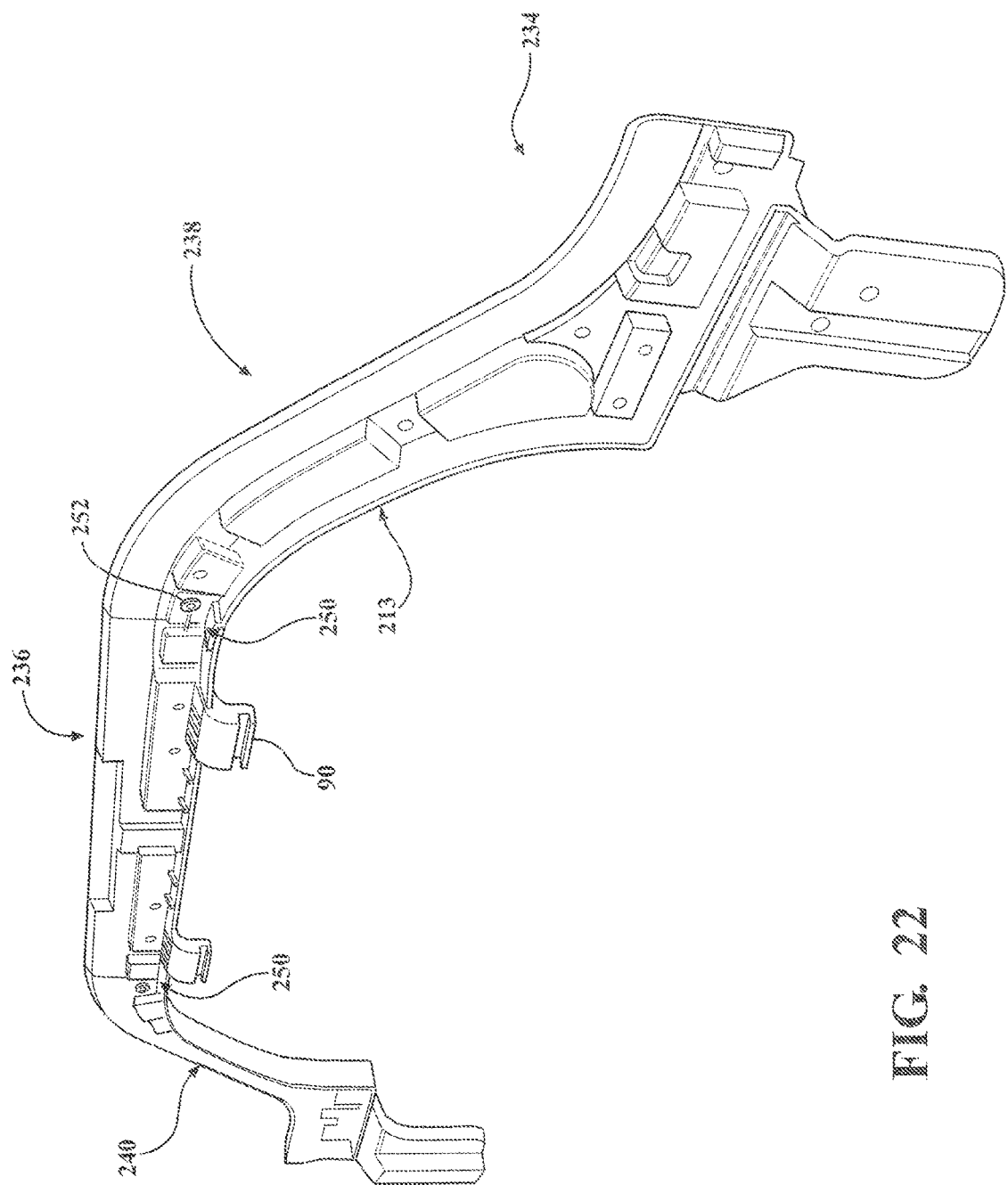
FIG. 22 is a bottom perspective view of a rear header portion of the rear header assembly comprising three segments connected together, in accordance with the present invention.
Figure 23:
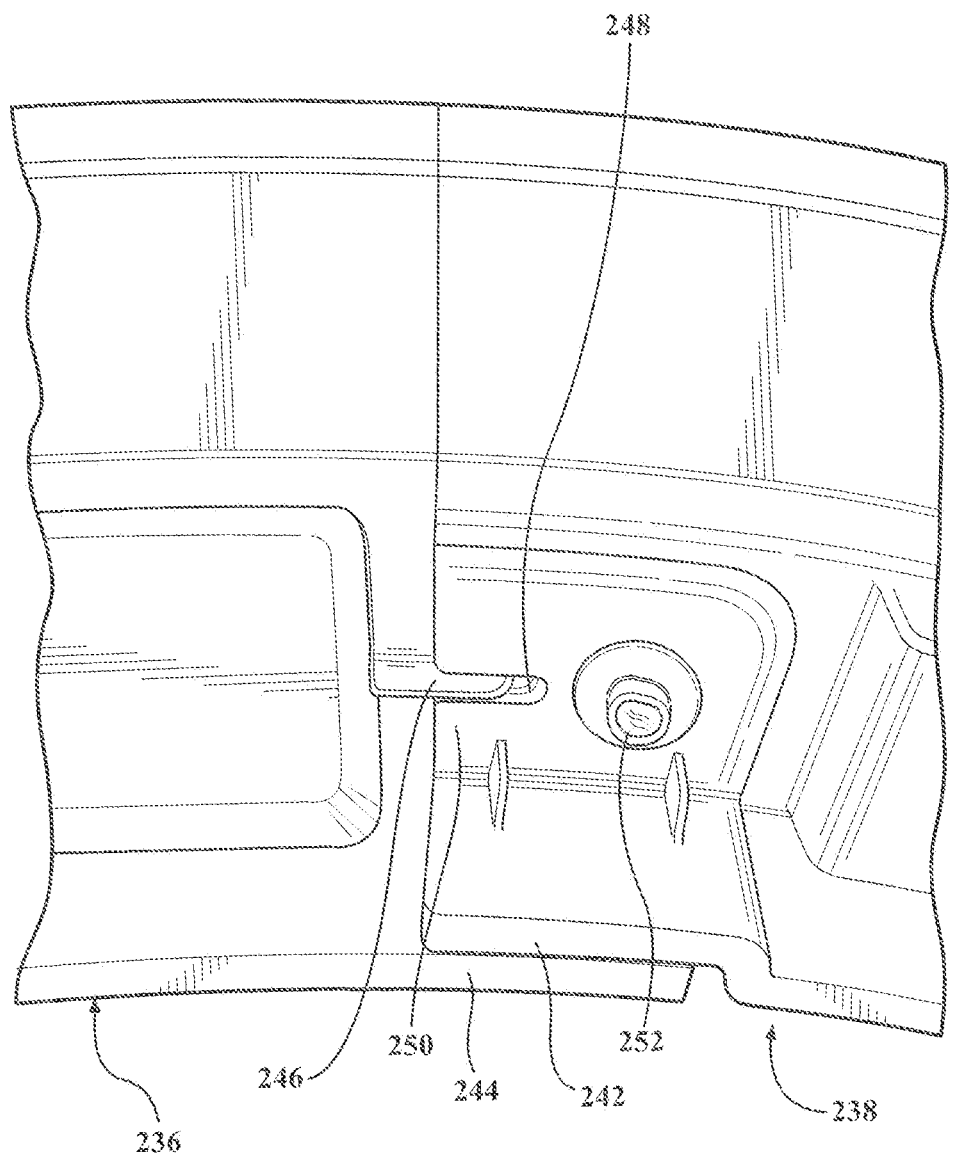
FIG. 23 is a bottom perspective view of a first outer segment of the rear header portion connected to a center segment of the rear header portion, in accordance with the present invention.
Figure 24:
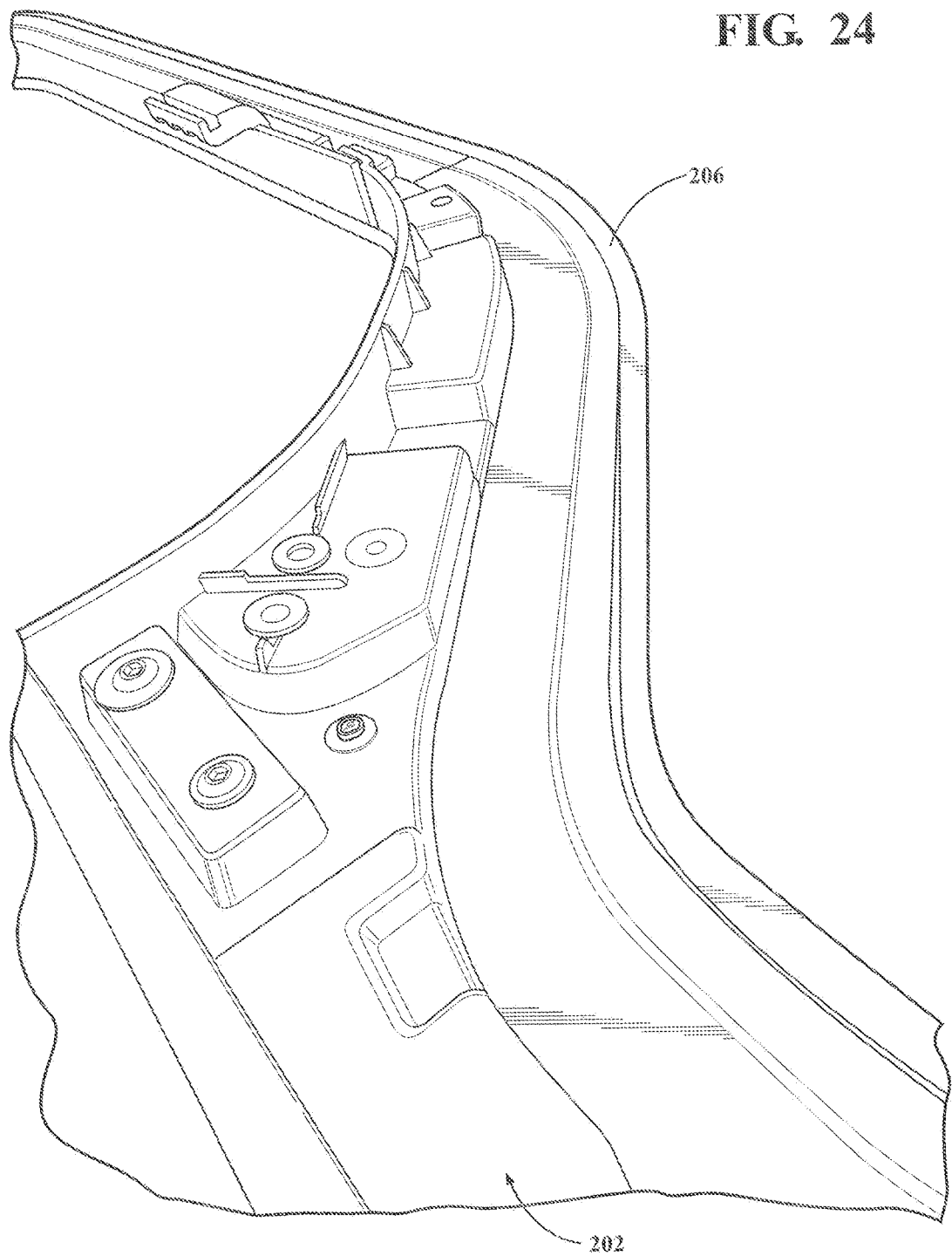
FIG. 24 is a bottom perspective view of the rear header portion, in accordance with the present invention.

Referring to FIGS. 22-24, there is depicted a rear header portion 234 that is a 3-piece header, according to an embodiment of the present invention. A center segment 236, first outer segment 238 and a second outer segment 240 are provided. The first and second outer segments 238 and 240 are operably connected toward the ends of the center segment 236. It is understood that more or less than three segments are contemplated depending on the application without departing from the scope of the present invention.

The rear header portion 234 is a single unit or any plurality of parts that combine to make the rear header.

Referring more particularly to FIG. 23, the end 242 of the first outer segment 238 overlaps the end 244 of the center segment 236. A rib 246 is also received in a slot 248, e.g., to allow the overlap and building strength at the area of connection 250. The respective segments are mechanically fastened using at least one fastener 252, e.g., screws, rivets, bolts, or any other suitable fastener to hold the segments together. Alternatively, or additionally, the segments are bonded together or adhesive is used.

Figure 25:
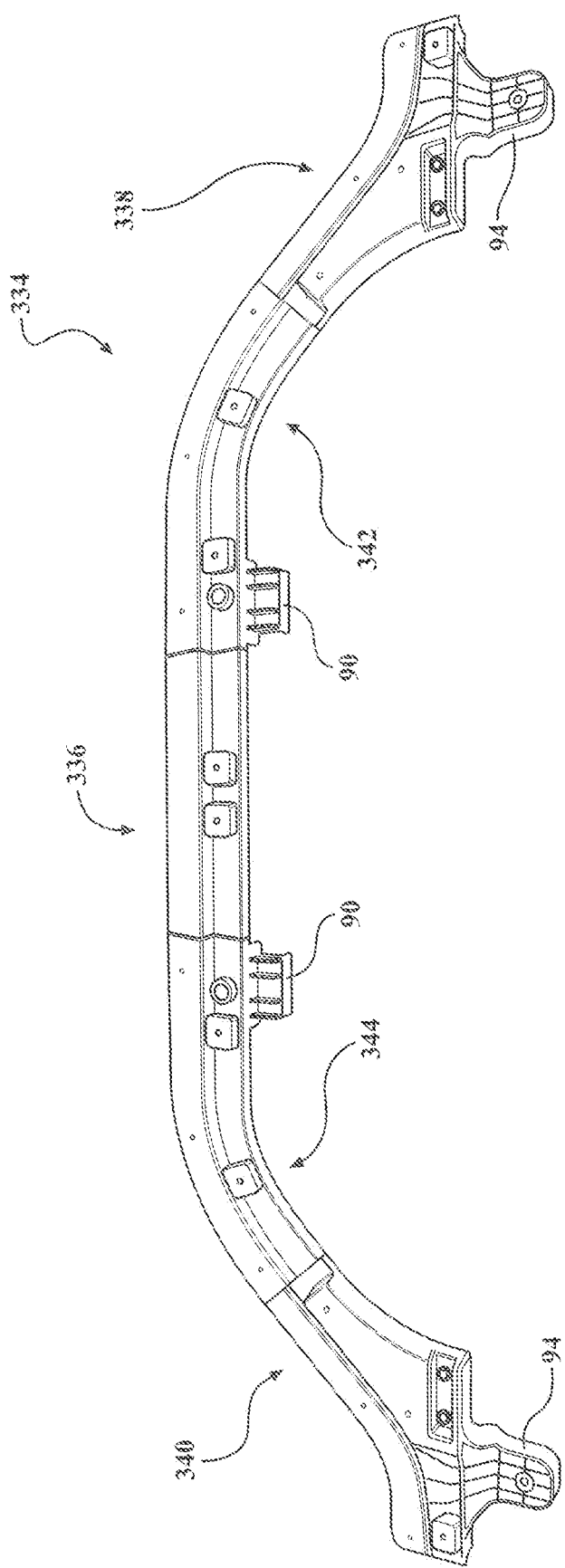
FIG. 25 is a top perspective view of a rear header portion comprising five segments, in accordance with another embodiment of the present invention.

Referring more particularly to FIG. 25, there is depicted a rear header portion 334 that is a 5-piece header, according to another embodiment of the present invention. A center segment 336, first outer segment 338, second outer segment 340, first intermediate segment 342 and second intermediate segment 344. The first and second outer segments 338 and 340 are operably connected toward the outermost ends of the first intermediate 342 and second intermediate segment 344, respectively. The first and second outer segments 342 and 344 are operably connected toward the ends of the center segment 336. The respective segments are mechanically fastened using at least one fastener as described above, e.g., screws, rivets, bolts, or any other suitable fastener to hold the segments together. Alternatively, or additionally, the segments are bonded together or adhesive is used.

It is understood that the present invention is additionally suitable for a two door or four door vehicle.

By utilizing the pivot points attached to the door rails this allows the operator to quickly cycle the top from the closed position to the open sunroof position without removing the top. The operator would then be able to cycle the top from the open position to the closed position and latch the top just as easily. The operator does not need to leave the vehicle in order to operate the top. The whole top is made lightweight by using the rear header (wireframe and/or molded rear header) and by using minimal frame and mostly soft goods. This helps with ease of installation and ease of cycle efforts. The soft panel top assembly enables the occupant to fold the top back to gain an open air experience without removing the top and can mount to the hardtop without modification to the vehicle. The soft panel top assembly has significant benefits over typical removable hard top cockpit panels and does not require modification to the vehicle or hard top roof portion in any way.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A panel top assembly for a vehicle having a windshield frame with side members extending therefrom and a cross member operably connecting the side members adjacent to the rear of a front cockpit of the vehicle, the soft panel top assembly comprising:
    at least two door rails attached to the side members of the vehicle;
    a pivotable portion pivotally connected to the at least two door rails;
    a header connected to the pivotable portion and adapted to selectively connect to the windshield frame;
    a rear header assembly operably coupled to the side members and the cross member, said rear header assembly operably coupled with a sealing system in engagement with a hardtop roof portion to provide a weather tight seal, said sealing system including a tertiary seal to provide a back-up weather resistant seal; and
    a roof top opening cover, said cover operably connected to the header and rear header, wherein pivoting the pivotable portion allows the cover to move between a closed position and an open position;
    wherein the rear header assembly further comprises:
    at least one upper rear header;
    at least one retainer operably connected to the cover and to the upper rear header;
    at least one rear header seal having an attachment portion and a sealing portion, said sealing portion being bulbous;
    at least one binding retainer operably connected to the at least one retainer and to the attachment portion of the at least one rear header seal such that the at least one retainer and the attachment portion are sandwiched together operable to retain the at least one rear header seal;
    wherein the at least one binding retainer, and the attachment portion are at least one of sewn together, bonded, and/or adhered together; and
    wherein said sealing portion is located substantially between the binding retainer and the hard top roof portion and in contact with at least one hard top seal to provide the weather tight seal.

2. The soft panel top assembly of claim 1, wherein when the rear header assembly is installed onto the vehicle, the rear header assembly compresses at least one rear header seal.

3. The soft panel top assembly of claim 1, wherein the at least one seal is selected from the group consisting of open cell foam, a closed cell foam material, ethylene propylene diene monomer, thermoplastic elastomers, thermoplastic vulcanizate a foam rubber, an extruded rubber, a formed/molded rubber mucket, a silicone material, and combinations thereof.

4. The soft panel top assembly of claim 1, wherein the at least one rear header seal is a closed cell foam and less stiff than the at least one hard top seal.

5. The soft panel top assembly of claim 1, wherein the tertiary seal is a continuous strip along the length of the rear header assembly to provide a back-up weather resistant seal.

6. The soft panel top assembly of claim 1, wherein the rear header assembly is additionally in sealing engagement with at least one other seal of the hard top portion to provide a weather tight seal.

7. The soft panel top assembly of claim 1, wherein the rear header assembly includes a rear header portion that is a molded material that is a single piece or a plurality of pieces operably connected together.

8. The soft panel top assembly of claim 7, wherein the rear header portion is three to five pieces operably connected together by at least one fastener, bonded and/or with adhesive.

9. The soft panel top assembly of claim 7, wherein the rear header portion is three molded pieces operably connected together by at least one fastener, bonded and/or with adhesive.

10. The soft panel top assembly of claim 1, wherein the pivotable portion further comprises two side rail linkage assemblies to provide the pivotable connection with the two door rails and allow the cover to move between a closed position and an open position.

11. The soft panel top assembly of claim 10, further comprising at least one bracket connected to each of the two door rails to provide at least one pivot point on each of the two door rails.

12. The soft panel top assembly of claim 10, wherein the pivotable portion further comprises:
   a first fabric management bow operably connected to each side rail linkage assembly and to the cover to manage fabric of the cover during movement of the cover between the open and closed positions and to minimize fabric movement when the soft panel top assembly is in the closed position; and
   a second fabric management bow operably fixedly connected to said rear header to at least minimize fabric movement when the soft panel top assembly is in the closed position.

13. The soft panel top assembly of claim 10, wherein the side rail linkage assemblies each further comprise:
   a first link fixedly connected to the header, said first link also pivotably connected to one of said brackets at a pivot point on the bracket, said first link pivotable about the pivot point;
   a third link pivotably connected to the bracket at a rearward pivot point on the bracket, said third link pivotable about the rearward pivot point;
   a second link pivotably connected to the first link at a third pivot point, said second link also pivotably connected to the third link at a fourth pivot point,
   a limiting stop operably connected to one of the links;
   wherein the bracket, first link, second link, and third link arrangement coordinates pivotable movement of the pivotable portion between the open and closed positions, and the limiting stop prevents the pivotable portion, other than the cover, from contacting the hard top roof portion to prevent damage.

14. The soft panel top assembly of claim 1, further comprising:
   at least one front corner seal affixed to each door rail; and/or
   at least one rear corner seal affixed to each door rail; and/or
   at least two front header seals affixed to the ends of the header to provide weather resistant seals.

15. The soft panel top assembly of claim 1, further comprising:
   a pair of opposing clamping surfaces provided on each of the two door rails to attach a front portion of each door rail to the respective side member; and
   a rear clamping surface provided on each of the two door rails to attach a rear portion of each door rail to the respective side member.

* * * * *